US012603485B2

(12) United States Patent　　　　(10) Patent No.:　US 12,603,485 B2

Warrick et al.　　　　　　　　　　　(45) Date of Patent:　Apr. 14, 2026

(54) UNDERGROUND ENCLOSURE ASSEMBLY AND METHOD

(71) Applicant: HTZ SOLUTIONS LLC, Northbrook, IL (US)

(72) Inventors: Jared Warrick, Huntley, IL (US); Justin W. Hillukka, Rockford, MN (US); Daniel S. Jariabka, Northbrook, IL (US)

(73) Assignee: HTZ SOLUTIONS LLC, Northbrook, IL (US)

( * ) Notice: Subject to any disclaimer, the term of this patent is extended or adjusted under 35 U.S.C. 154(b) by 0 days.

(21) Appl. No.: 19/206,982

(22) Filed: May 13, 2025

(65) Prior Publication Data

US 2025/0273942 A1　　Aug. 28, 2025

Related U.S. Application Data

(63) Continuation of application No. PCT/US2024/015932, filed on Feb. 15, 2024.

(60) Provisional application No. 63/542,691, filed on Oct. 5, 2023, provisional application No. 63/509,278, filed on Jun. 20, 2023, provisional application No. 63/485,696, filed on Feb. 17, 2023.

(51) Int. Cl.
H02G 3/08　　　　(2006.01)
E02D 29/12　　　　(2006.01)

(52) U.S. Cl.
CPC ............. H02G 3/081 (2013.01); E02D 29/12 (2013.01)

(58) Field of Classification Search
CPC ................................ G01R 11/04; H02G 3/081
USPC .................................................. 220/4.28, 484
See application file for complete search history.

(56) References Cited

U.S. PATENT DOCUMENTS

| | | |
|---|---|---|
| 3,868,040 A | 2/1975 | Langmack, Jr. et al. |
| 3,974,599 A | 8/1976 | Grosh |
| 4,163,503 A | 8/1979 | McKinnon |
| D267,228 S | 12/1982 | Channell |
| D298,031 S | 10/1988 | Channell |
| D315,906 S | 4/1991 | Channell |
| D317,908 S | 7/1991 | Channell |
| 5,513,471 A | 5/1996 | Worms et al. |

(Continued)

FOREIGN PATENT DOCUMENTS

| | | |
|---|---|---|
| DE | 9208786 U1 | 9/1992 |
| EP | 2604758 A1 | 6/2013 |
| GB | 2598623 A | 3/2022 |

OTHER PUBLICATIONS

International Search Report and Written Opinion of the International Searching Authority, PCT International Patent application No. PCT/US2015/050592, mailed Aug. 14, 2024, 17 pages.

*Primary Examiner* — Stephen J Castellano

(74) *Attorney, Agent, or Firm* — MARSHALL, GERSTEIN & BORUN LLP

(57) ABSTRACT

An underground enclosure assembly configured for use with one or more of communications, power and/or irrigation system equipment. The underground enclosure assembly includes a shell assembly with at least two shell members coupled to each other via at least one snap projection and a lid removably coupled to the shell assembly via at least two bolt assemblies. The lid includes an underside with a plurality of ribs and a flange extending downwardly from a rim portion of the lid.

20 Claims, 25 Drawing Sheets

(56)  References Cited

U.S. PATENT DOCUMENTS

| | | | |
|---|---|---|---|
| 6,668,392 B2 | 12/2003 | Mason | |
| 7,030,315 B1 | 4/2006 | Dunn et al. | |
| 7,144,189 B1 * | 12/2006 | Bongiovanni | E02D 29/1427 |
| | | | 404/25 |
| 7,381,888 B2 | 6/2008 | Burke et al. | |
| 7,385,137 B2 | 6/2008 | Burke et al. | |
| 7,547,051 B2 | 6/2009 | Burke et al. | |
| 7,966,786 B2 | 6/2011 | Koteskey | |
| 8,220,298 B2 | 7/2012 | Burke et al. | |
| 8,245,452 B2 | 8/2012 | Koteskey | |
| 8,249,411 B2 | 8/2012 | Burke | |
| 8,708,183 B2 | 4/2014 | Burke | |
| 8,796,548 B2 | 8/2014 | Rost et al. | |
| 8,847,070 B2 | 9/2014 | Burke | |
| 9,287,693 B2 | 3/2016 | Burke | |
| 9,876,340 B2 | 1/2018 | Unger et al. | |
| 10,136,530 B2 | 11/2018 | Dang et al. | |
| 10,252,709 B2 | 4/2019 | Barana et al. | |
| 10,265,890 B2 | 4/2019 | Burke et al. | |
| 10,288,106 B2 | 5/2019 | Lemacks | |
| 10,358,285 B2 | 7/2019 | Burke et al. | |
| 10,663,688 B2 | 5/2020 | Safranek et al. | |
| 10,748,455 B2 | 8/2020 | Lemacks et al. | |
| 10,757,836 B2 | 8/2020 | Lemacks et al. | |
| 10,894,498 B2 | 1/2021 | Lee et al. | |
| 10,947,693 B2 | 3/2021 | Dang et al. | |
| 11,008,134 B2 | 5/2021 | Nolen et al. | |
| 11,066,802 B1 | 7/2021 | Nolen et al. | |
| D928,723 S | 8/2021 | Weinerman et al. | |
| 11,338,524 B1 | 5/2022 | Nolen et al. | |
| 11,349,281 B1 | 5/2022 | Nolen et al. | |
| 11,374,386 B2 | 6/2022 | Nolen et al. | |
| 11,486,166 B2 | 11/2022 | Gwillim et al. | |
| 11,940,468 B2 * | 3/2024 | Cook | G01R 22/063 |
| 2011/0036735 A1 * | 2/2011 | Cho | A45C 13/36 |
| | | | 206/349 |
| 2011/0183599 A1 | 7/2011 | German | |
| 2014/0117018 A1 * | 5/2014 | Burke | H02G 9/10 |
| | | | 220/484 |
| 2017/0023045 A1 | 1/2017 | Lemacks | |
| 2017/0260712 A1 | 9/2017 | Dang et al. | |
| 2019/0176375 A1 | 6/2019 | Burke et al. | |
| 2021/0332616 A1 | 10/2021 | Burke | |
| 2021/0332617 A1 | 10/2021 | Burke | |
| 2022/0049452 A1 | 2/2022 | Burke et al. | |
| 2022/0250332 A1 | 8/2022 | Nolen et al. | |
| 2022/0255299 A1 | 8/2022 | Nolen et al. | |

* cited by examiner

Section A-A

Section A-A

Section A-A

*241*

*245*        *245*

*241*

*241*

241

6

243

255

214

257

214

214

257

259     259

255

UNDERGROUND ENCLOSURE ASSEMBLY AND METHOD

CROSS-REFERENCE TO RELATED APPLICATIONS

This is a continuation of PCT Application No. PCT/US2024/15932, filed Feb. 15, 2024, which claims the priority benefit of U.S. Provisional Patent Application No. 63/485,696, filed Feb. 17, 2023, the priority benefit of U.S. Provisional Patent Application No. 63/509,278, filed Jun. 20, 2023, and the priority benefit of U.S. Provisional Patent Application No. 63/542,691, filed Oct. 5, 2023, the entire contents of each of which are hereby incorporated herein by reference.

TECHNICAL FIELD

The present disclosure relates to underground enclosures and, more specifically, to a underground enclosure assembly for communications, power and/or irrigation equipment and any related products

BACKGROUND

It is known to use underground enclosures to protect various communications, power and irrigation system equipment, such as cables and telecommunications boxes, broadband equipment, and Wifi equipment. However, conventional underground enclosures for such equipment are typically extremely heavy due to steel, polymer concrete, and/or concrete reinforcements, and various other heavy materials used in their construction. In addition, the conventional enclosures often include multiple fasteners and securing devices and many component parts to the housing, for example, making it time consuming to both manufacture and then assemble in the field. Further, conventional enclosures are also susceptible to supply chain delays.

SUMMARY

In accordance with a first exemplary aspect, an underground enclosure assembly configured for use with one or more of communications, power and/or irrigation system communications, power and/or irrigation system equipment comprises a shell assembly with at least two shell members coupled to each other via at least one snap projection; and a lid removably coupled to the shell assembly via at least two bolt assemblies. The lid includes an underside with a plurality of ribs and a flange extending downwardly from a rim portion of the lid.

In accordance with a second exemplary aspect, an underground enclosure assembly configured for use with communications, power and/or irrigation system equipment comprises a clamshell assembly having a first clamshell member and a second clamshell member coupled to the first clamshell member. Each of the first and second clamshell members has at least one side edge with a plurality of snap projections and a plurality of apertures. In addition, the plurality of snap projections of the first clamshell member snaps into the plurality of apertures of the second clamshell member to couple the first and second shell members to each other. A lid is removably coupled to the clamshell assembly via at least two bolt assemblies.

A method of assembling an enclosure assembly configured for use with one or more of communications, power and/or irrigation system equipment, the method comprises providing a first shell member having at least one side edge with at least one snap projection and a plurality of apertures and providing a second shell member having at least one side edge with at least one snap projection and a plurality of apertures. The method further comprises snapping the at least one snap projection of the first shell member into one aperture of the plurality of apertures of the second shell member to attach a first side edge of the first shell member to a second side edge of the second shell member. The method also includes rotating the second shell member such that another snap projection of the first shell member is disposed into another aperture of the plurality of apertures of the second shell member to attach a second side edge of the first shell member to a first side edge of the second shell member, coupling the first and second shell members together. The method still also includes coupling a lid to the first and second shell members via two bolt assemblies, the lid including an underside with a plurality of ribs and a flange extending downwardly from a rim portion of the lid.

In accordance with another exemplary aspect, an underground enclosure assembly configured for use with one or more of communications, power and/or irrigation system equipment, the underground enclosure assembly comprises a shell assembly with at least two shell members coupled to each other via at least one snap projection, at least one shell member having an outside surface and a brace assembly, the brace assembly including a support channel disposed on the outside surface. In addition, the underground enclosure assembly further comprises a lid removably coupled to the shell assembly via at least two bolt assemblies, the lid including a flange extending downwardly from a rim portion of the lid and an underside with a plurality of ribs and a lid support. The lid support includes a frame having a pair of side bars, a pair of end bars, and an internal bar disposed between the pair of side bars.

Any one or more of these aspects may be considered separately and/or combined with each other in any functionally appropriate manner. In addition, any one or more of these aspects may further include and/or be implemented in any one or more of the optional exemplary arrangements and/or features described hereinafter. These and other aspects, arrangements, features, and/or technical effects will become apparent upon detailed inspection of the figures and the following description.

BRIEF DESCRIPTION OF THE DRAWINGS

The features of this disclosure which are believed to be novel are set forth with particularity in the appended claims. The present disclosure may be best understood by reference to the following description taken in conjunction with the accompanying drawings, in which like reference numerals identify like elements in the several figures, and in which:

DETAILED DESCRIPTION

Generally, an underground enclosure assembly configured for use with one or more of communications, power, and/or irrigation systems equipment, and all future derivatives of such equipment, includes a shell or a clamshell design configuration forming a shell assembly. More specifically, and in one example, the communications system equipment may include one or more of telecommunications, broadband, Wi-Fi, and/or fiber optic system equipment and all any future variations and/or updates to the same. In another example, the power systems equipment may include one or more of street and/or highway lighting, traffic control systems, and power and lighting systems for parking lots and/or shopping centers, for example. In yet another example, the irrigation systems equipment may include one or more of lawn sprinkler system equipment, municipal water system equipment and the like. There are at least two shell members of the shell assembly that are coupled to each other via at least one snap member, e.g., a snap projection, significantly reducing a number of fasteners needed to clip or couple the shell members together. One shell member may be rotated 180 degrees from the other shell member, e.g., which includes the other half of the enclosure, and then snapped together. A lid is removably coupled to the shell members via at least two bolt assemblies and/or a plurality of bolt assemblies, each of which includes a retainer nut coupled to a corner of each shell member and a bolt disposed through an aperture of the lid and into the retainer nut. The lid also includes an underside with a plurality of ribs and a flange extending downwardly from a rim portion of the lid. Further, each shell member and the lid are made of high-density polyethylene (HDPE), such as structural foam HDPE. So configured, the unique snap together design reduces a total number of fasteners required to assemble the enclosure assembly. In addition, the new underground enclosure assembly has a generous radius on the corners, allowing faster installation in the field, such that corners of holes dug do not need to perfectly match the dimensions of corners of the underground enclosure assembly.

Figure 1:
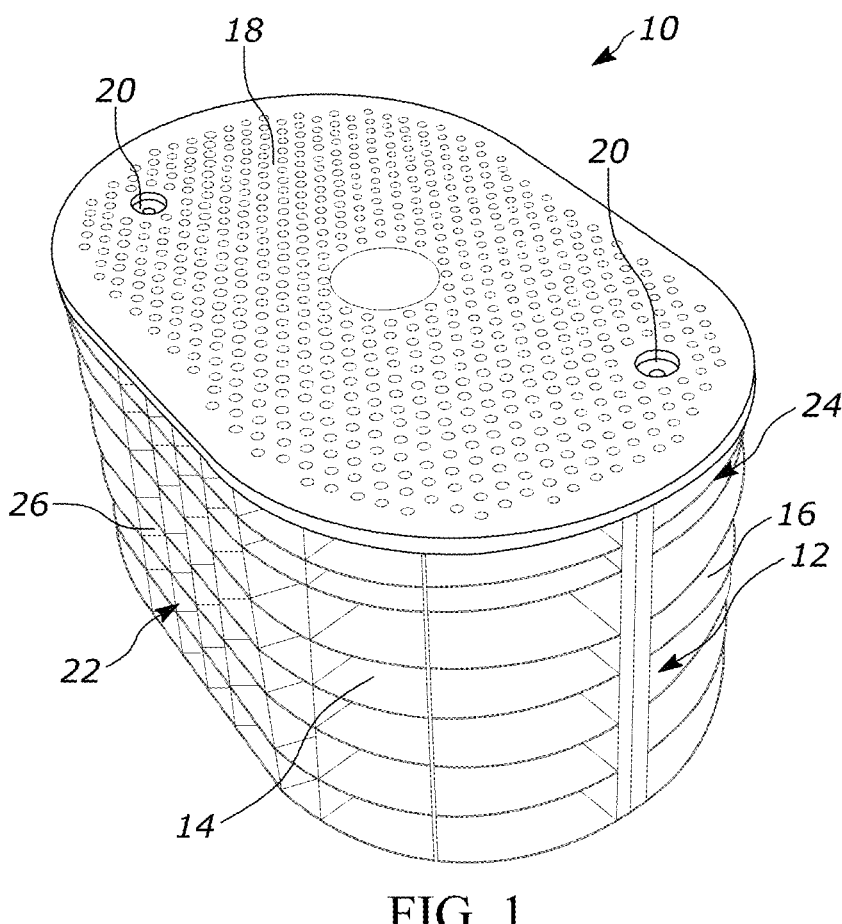
FIG. 1 is a perspective view of the underground enclosure assembly of the present disclosure.
Figure 2:
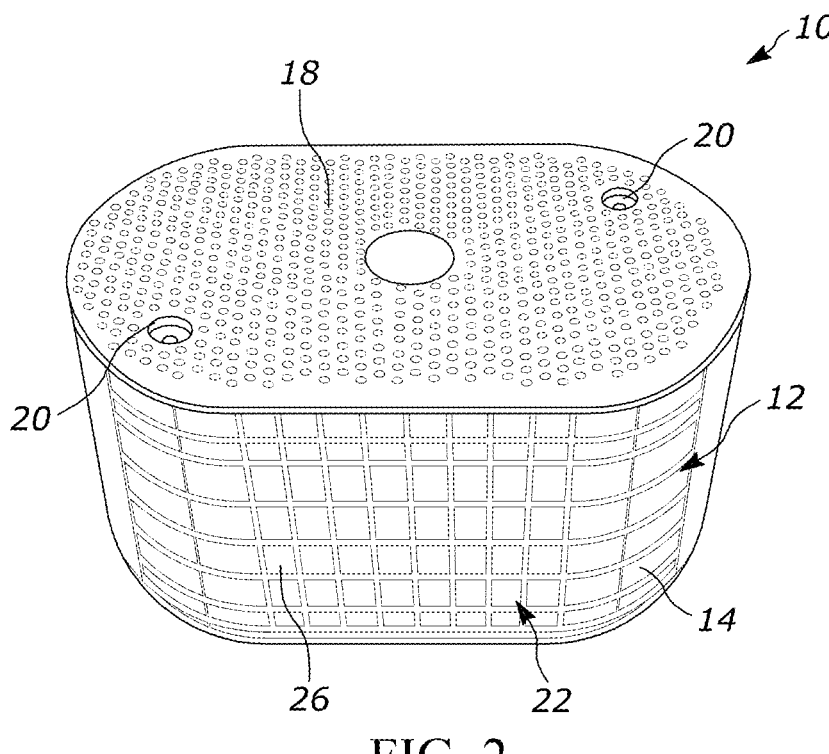
FIG. 2 is a front perspective view of the underground enclosure assembly of FIG. 1.

Referring now to FIGS. 1 and 2, an underground enclosure assembly 10 configured for use with one or more of telecommunications equipment (e.g., such as a telecommunications box), broadband equipment, and Wifi equipment, according to the present disclosure is depicted. The underground enclosure assembly 10 includes a shell assembly 12 with at least two shell members 14, 16 that are coupled to each other via at least one snap projection, as explained more below. The underground enclosure assembly 10 also includes a lid 18 removably coupled to the shell assembly 12 via at least two bolt assemblies 20. In one example, the two shell members 14, 16 include a first shell member 14 and a second shell member 16. In addition, each shell member 14, 16 includes an outside wall 22, 24 having a grid pattern 26, 28 (see, e.g., FIG. 3) with a plurality of ribs to reinforce the structural integrity of each shell member 14, 16, for example and as explained more below. Further, each shell member 14, 16 is identical to the other shell member 14, 16; therefore, all parts that may be explained relative to the shell member 14, such as the first shell member 14, are also included on the other shell member 16, such as the second shell member 16. While this example depicts the at least two shell members 14, 16 as including two shell members 14, 16, it will be appreciated that more than two shell members may comprise the at least two shell members and still fall within the scope of the present disclosure, as explained more below.

Figure 3:
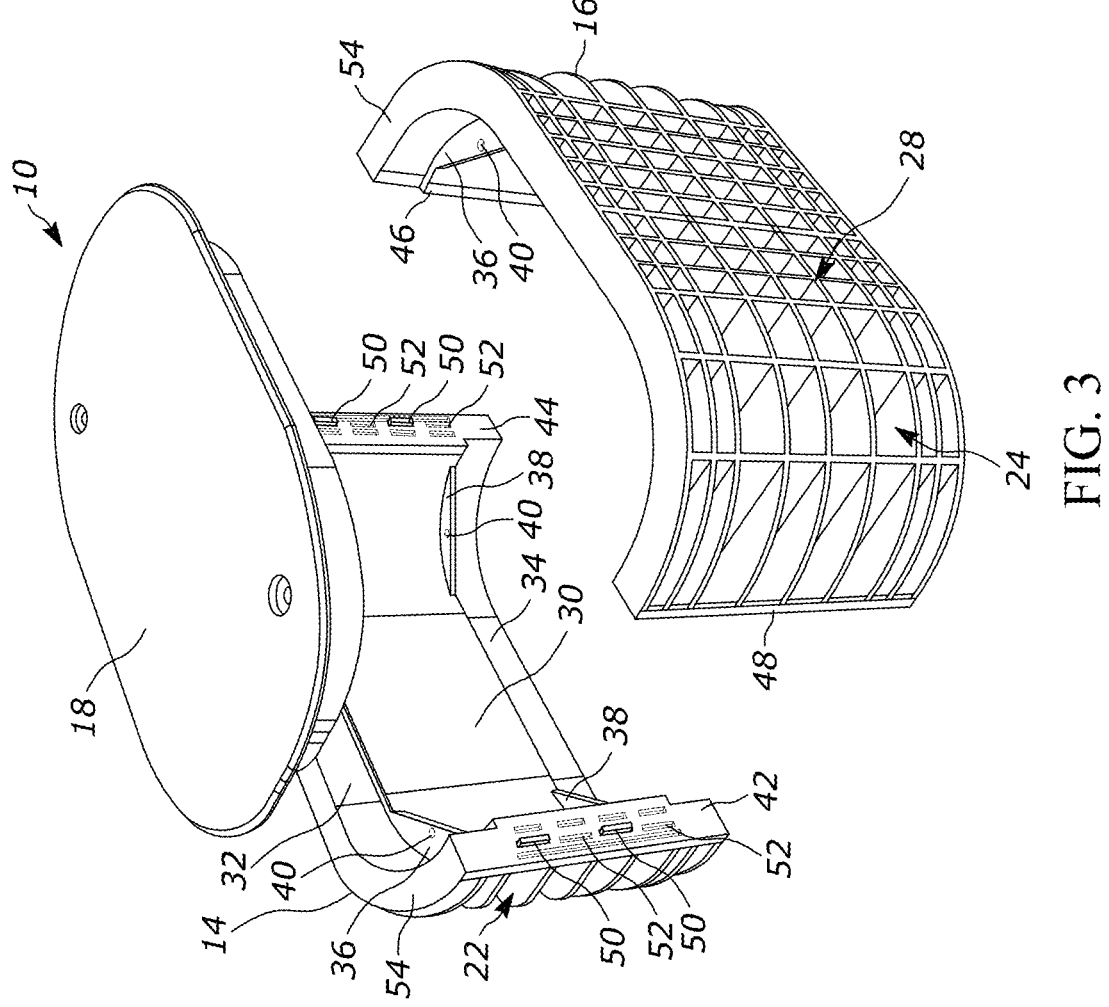
FIG. 3 is an exploded view of the underground enclosure assembly of FIG. 1.

Referring now to FIG. 3, each shell member 14, 16 includes an inside wall 30 having a top portion 32, a bottom portion 34, an upper shelf 36 disposed near the top portion 32 of the inside wall 30, and a lower shelf 38 disposed near a bottom portion 34 of the inside wall 30. Each of the upper shelf 36 and the lower shelf 38 includes an aperture 40, as depicted in FIG. 3. While the parts of the shell members 14, 16 are best depicted relative to the shell member 14, e.g., the first shell member 14 of FIG. 3, it will be appreciated that the same parts are also included on the shell member 16, e.g., the second shell member 16. In addition, and as further depicted in FIG. 3, the shell assembly 10 may include a clamshell assembly, such as taking the shape of a clamshell in this example. For example, each shell member 14, 16 may include a clamshell member 14, 16, such that the clamshell members 14, 16 are the first clamshell member 14 and the second clamshell member 16. In addition, each shell member 14, 16, such as each clamshell member 14, 16 may have a C-shape. While the C-shape of each shell member 14, 16 is depicted in FIG. 3, it will be appreciated that the shell members 14, 16 may alternatively take the form of various other shapes capable of operating in the same manner as the shell members 14, 16 depicted in FIGS. 1-3, for example, and still fall within the scope of the present disclosure.

Still referring to FIG. 3 and in another example, each shell member 14, 16 of the shell assembly 12 may include side edges. Specifically, the first shell member 14 may include a first side edge 42 and a second side edge 44 disposed on a side of the first shell member 14 opposite to the first side edge 42, for example. In addition, and in the same manner as the first shell member 14, the second shell member 16 may include a first side edge 46 and a second side edge 48. In this example, the first side edge 42 of the first shell member 14 is coupled to the second side edge 48 of the second shell member 16 when the first shell member 14 is coupled to the second shell member 16 and the underground enclosure assembly is in an assembled state, as depicted in Fi. 1, for example. In addition, the second side edge 44 of the first shell member 14 is coupled to the first side edge 46 of the second shell member 16 when the first shell member 14 is coupled to the second shell member 16, forming the shell assembly 12 (FIG. 1).

As depicted in FIG. 3, the first and second side edges 42, 44 of the first shell member 14 include at least one snap member, such as a snap projection 50, and at least one aperture 52. Although not depicted in FIG. 3, each of the first and second side edges 46, 48 of the second shell member 16 likewise includes the at least one snap member, such as the snap projection 50, as explained more below. So configured, the at least one snap projection 50 of the first and second sides 42, 44 of the first shell member 14 snaps into the at least one aperture 52 of the first and second sides 46, 48 of the second shell member 16, as also explained more below. In addition, the first shell member 14 and the second shell member 16 each includes a top surface 54 on which a rim portion of the lid 18 is disposed, as also explained more below. Once snapped together, the top and bottom are designed to be the same, such that they cannot be installed incorrectly.

Figure 4:
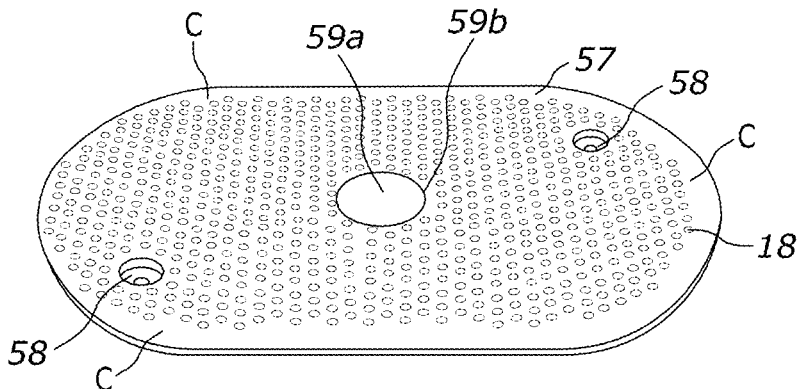
FIG. 4 is a top view of a lid of the underground enclosure assembly of FIG. 1.
Figure 5:
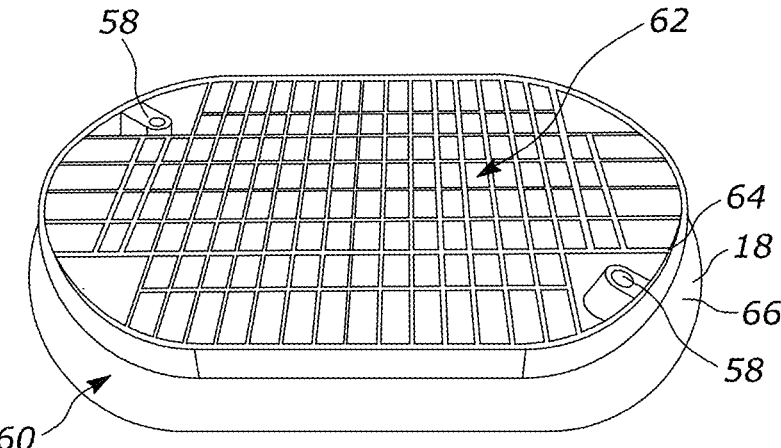
FIG. 5 is a bottom view of the lid of FIG. 4.

Referring now to FIGS. 4 and 5, the lid 18 of the underground enclosure assembly 10 of the present disclosure is depicted removed from the shell assembly 12 (FIG.

1). The lid 18 includes a top surface 57 and two apertures 58 disposed on the top surface 57 along a circumference C of the lid 18 at a distance equidistant from each other. The lid 18 may alternatively be disposed along the circumference C of the lid 18 at a distance not equidistant from each other and still fall within the scope of the present disclosure. Each aperture 58 is configured to receive or receives a bolt (not shown) of one of the two bolt assemblies 20 (FIG. 1) to couple the lid 18 to the shell assembly 12, forming the underground enclosure assembly 10. In addition, each of the two shell members 14, 16 includes a retainer nut, such as an anchor nut, and each retainer nut is configured to or receives the bolt of one of the two bolt assemblies 20 to secure the lid 18 to the shell assembly 12, as explained more below.

As further depicted in FIG. 4, the lid 18 includes an insert 59a disposed on the top surface 57 of the lid 18. In this example, the insert 59a is a removable, such as a snap in, logo puck 59a. The logo puck 59a may include branding, such as customer branding indicating identification information of the customer, for example. The lid 18 includes a receiving portion 59b disposed in a central location on the top surface 57 of the lid 18 that receives the insert 59a, in this case the logo puck 59a, as depicted. While the receiving portion 59b is disposed in the central location of the top surface 57 of the lid 18, the receiving portion 59b may alternatively be disposed in another location or area of the top surface 57 of the lid 18 and still fall within the scope of the present disclosure. So configured, the insert, such as the logo puck 59a is interchangeable to include a variety of logo pucks with different customer branding. The insert 59a, e.g., the logo puck 59a may be easily snapped or bolted into the receiving portion 59b and easily removed from the same, allowing different logo pucks with specific customer branding to be included on the lid 18. In another example, the insert 59a includes a changeable insert in a tool so different logos may additionally and/or alternatively be used. In yet another example, the insert 59a is made of an aluminum sandwich material, with multiple layers including a top layer having aluminum material, a bottom layer having aluminum material, and a middle layer having plastic disposed between the top and bottom layers.

As further depicted in FIG. 5, the lid 18 also includes an underside 60 having a plurality of ribs 62 and a flange 64 extending downwardly from a rim portion 66 of the lid 18. The entire lid 18 including the plurality of ribs 62 and the flange 64 comprises HDPE material. In one example, the flange 64 is a ¼"×⅛" protrusion. So configured, the rim portion 66 of the lid 18 surrounds the circumference C of the lid 18 and is disposed on the top surfaces 54 of each of the first and second shell members 14, 16 (FIG. 3) when the lid 18 is coupled to the shell assembly 12 of the underground enclosure assembly 10. In this way, the lid 18 and the flange 64 together keep unwanted materials, such as water and ice, from entering the shell assembly 12, for example. The lid 18 is designed to cover the first and second shell members 14, 16, as explained more below. While the underground enclosure assembly 10 is not watertight, the new configuration of the present disclosure reduces the possibility of the lid 18 freezing to one or both of the first and second shell members 14, 16, for example.

Figure 6:
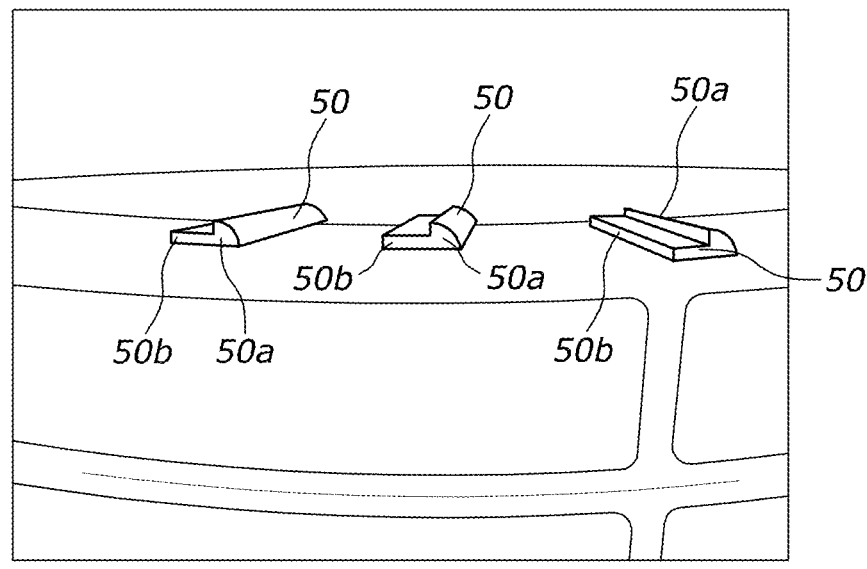
FIG. 6 is a perspective view of a plurality of snap projections disposed on a portion of the underground enclosure assembly of FIG. 1.

Referring now to FIG. 6, three exemplary snap members 50, such as snap projections 50, are disposed on a top portion of the first shell member 14 for display purposes only. While the three exemplary snap members 50 are depicted for display purposes only, it will be appreciated that a plurality of snap members 50 may be used, and the plurality of snap members 50 may include two, three, four, five or more snap members 50, for example, and still fall within the scope of the present disclosure. As depicted, each of the snap members 50 includes a first portion 50*a* and a second portion 50*b*. The second portion 50*b* is adapted to be disposed into the at least one aperture 52 of the first and second sides 42, 44, 46, 48 of the first and second shell members 14, 16. The first portion 50*a* extends outside of the first and second sides 42, 44, 46, and 48 of the first and second members 14, 16 when the second portion 50*b* of the snap projection 50 is disposed into the at least one aperture 52. In this way, the first portion 50*a* forms the projection of the snap projection 50 when the snap projection 50 is disposed in the at least one aperture 52 (see, e.g., FIG. 3).

Figure 7:
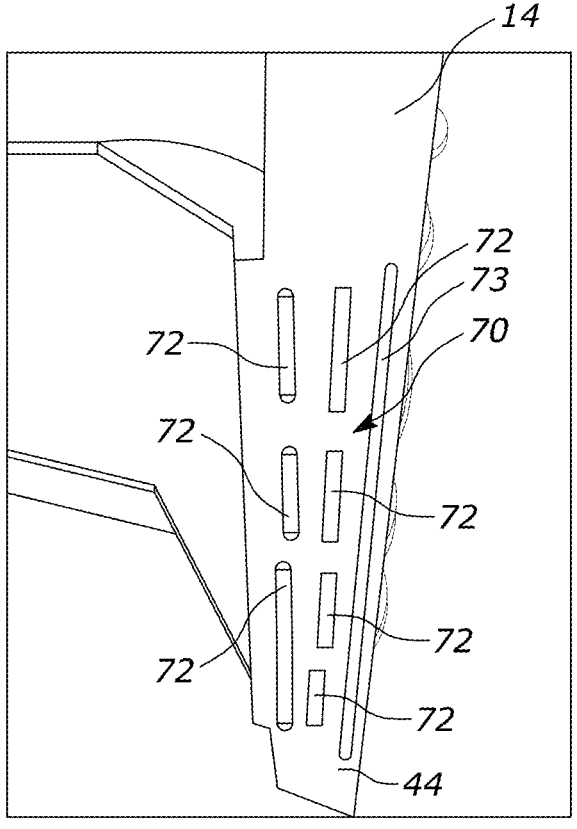
FIG. 7 is close-up view of a second side edge of a first shell member of the underground enclosure assembly of FIG. 1.

Referring now to FIG. 7, the second side 44 of the first shell member 14 is depicted. In this example, the at least one aperture 52 of the second side 44 of the first shell member 14 includes a plurality of apertures 70. In this example, the plurality of apertures 70 includes seven apertures 72 disposed in two rows, one with four apertures 72 having a rectangular shape and another with three apertures 72 having an oval shape. In other examples, there may be fewer than four apertures 72, such as three or two apertures, and still fall within the scope of the present disclosure. Some apertures 72 of the plurality of apertures 70 having the rectangular shape in this example are adapted to receive the second portion 50*b* of the snap projection 50, as explained more below. It will be appreciated that the apertures may have different shapes than being rectangular and/or oval and still fall within the scope of the present disclosure. In addition, the second side 44 of the first shell member 14 also includes a longitudinal protruding rib 73 configured to be inserted into a longitudinal slot of another shell member when the first shell member 14 is coupled to another shell member, as also explained more below.

Figure 8:
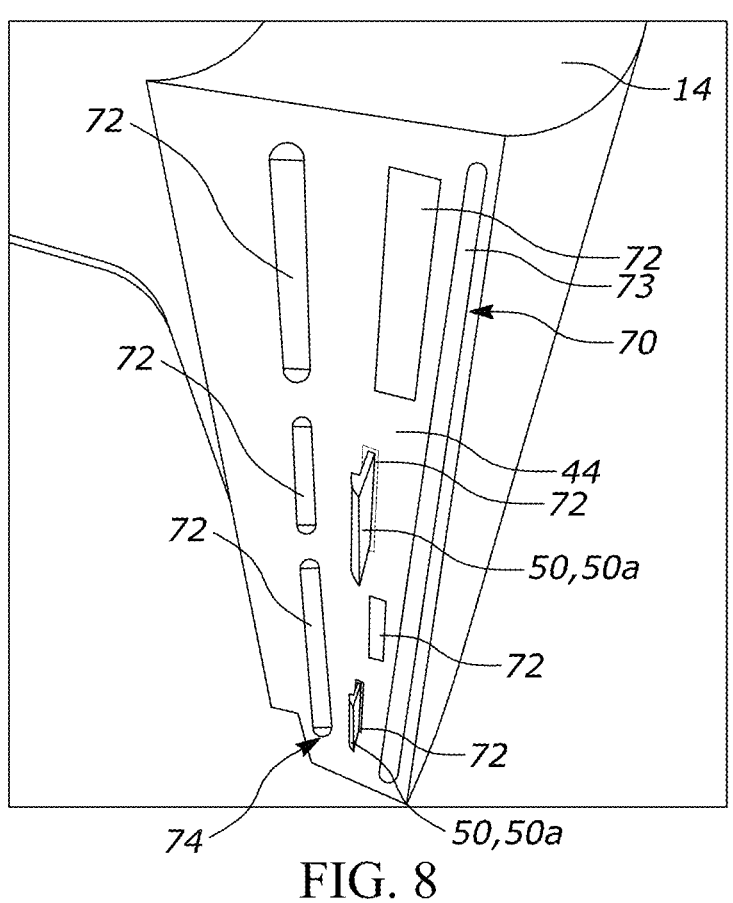
FIG. 8 is a close-up view of the second side edge of the first shell member of FIG. 7 with two snap projections.

Referring now to FIG. 8, the same second side 44 of the first shell member 14 of FIG. 7 is again depicted including the plurality of apertures 70, but also with two snap projections 50 disposed in two apertures 72 of the plurality of apertures 70. More specifically, in this example, the at least one snap projection 50 includes a plurality of snap projections 74 having the two snap projections 50. While this is depicted relative to the second side edge 44 of the first shell member 14, the second side edge 48 of the second shell member 16 (FIG. 3) also includes this same configuration. Moreover, while the plurality of snap projections 74 include the two snap projections 50, more snap projections 50 may alternatively be used, such as three, four, five, six, seven or more snap projections 50, and still fall within the scope of the present disclosure. The first portion 50*a* of each snap projection 50 extends outwardly from the aperture 72 into which the second portion 50*b* (not shown) is disposed. Although not depicted, the second side 48 of the second shell member 16 (FIG. 1) includes the exact same features as the second side 44 of the first shell member 14 described above.

Figure 9:
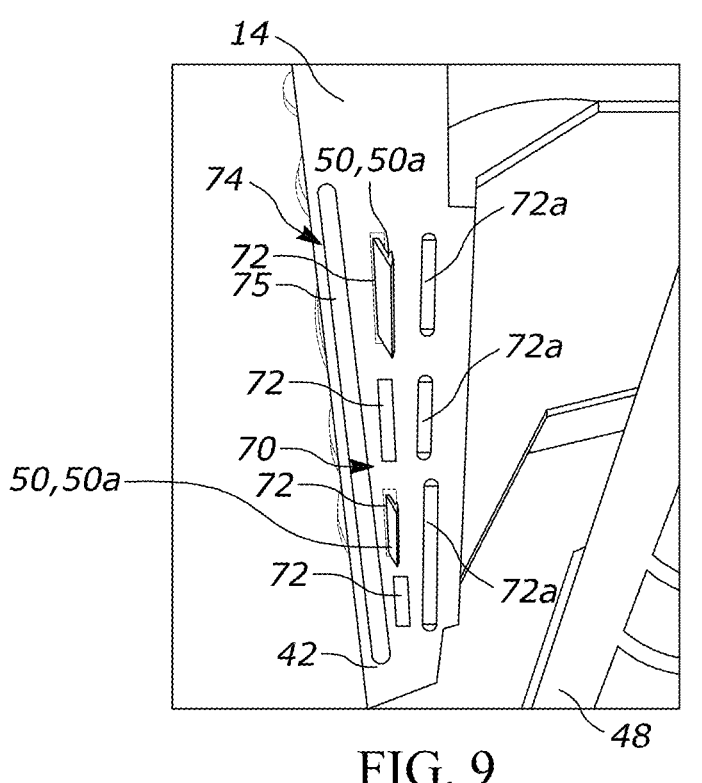
FIG. 9 is a close-up view of a first side edge of the first shell member of the underground enclosure assembly of FIG. 1.

Referring now to FIG. 9, the first side 42 of the first shell member 14 is depicted. Like the second side 44 of the first shell member 14 of FIG. 8, the first side 42 of the first shell member 14 also includes the at least one aperture 52 of the second side 44 of the first shell member 14 having a plurality of apertures 70. In this example, the plurality of apertures 70 again includes four apertures 72 disposed in a row. Each aperture 72 of the plurality of apertures 70 is adapted to receive the second portion 50*b* of the snap projection 50.

As further depicted in FIG. 9, there are two snap projections 50 disposed in two apertures 72 of the plurality of apertures 70. More specifically, in this example, the at least one snap projection 50 also includes a plurality of snap projections 74 having the two snap projections 50. While this is depicted relative to the first side edge 42 of the first shell member 14, the first side edge 46 of the second shell member 16 (FIG. 3) also includes this same configuration. Moreover, while the plurality of snap projections 74 include the two snap projections 50, more snap projections 50 may alternatively be used, such as three or four snap projections 50, and still fall within the scope of the present disclosure. The first portion 50*a* of each snap projection 50 extends outwardly from the aperture 72 into which the second portion 50*b* (not shown) is disposed.

In addition, the first side 42 of the first shell member 14 depicted in FIG. 9 also includes a plurality of protruding ribs 72*a* including three protruding ribs 72*a* in this example that are disposed generally adjacent the slots 72 in a row separate from the slots 72. The protruding ribs 72*a* are configured to be disposed in the apertures 72 having an oval shape, for example, of the second shell member 16 when the first and second shell members 14, 16 are coupled together. While three protruding ribs 72*a* are depicted, it will be appreciated that two protruding ribs 72*a* or more than three protruding ribs 72*a* may alternatively be used and still fall within the scope of the present disclosure. As also depicted in FIG. 9, the first side 42 of the shell member 42 also includes a longitudinal slot 75 that receives the longitudinal protruding rib 73 of the second shell member 16 when the first and second shell members 14, 16 are coupled together.

The plurality of snap projections 74 of each of the first and second sides 42, 44, 46, 48 of the first and second shell members 14, 16 snaps into the corresponding plurality of apertures 70 of the other side edge of one of the first shell member 14 or the second shell member 16 to couple the first and second shell members 14, 16 together.

Figure 10:
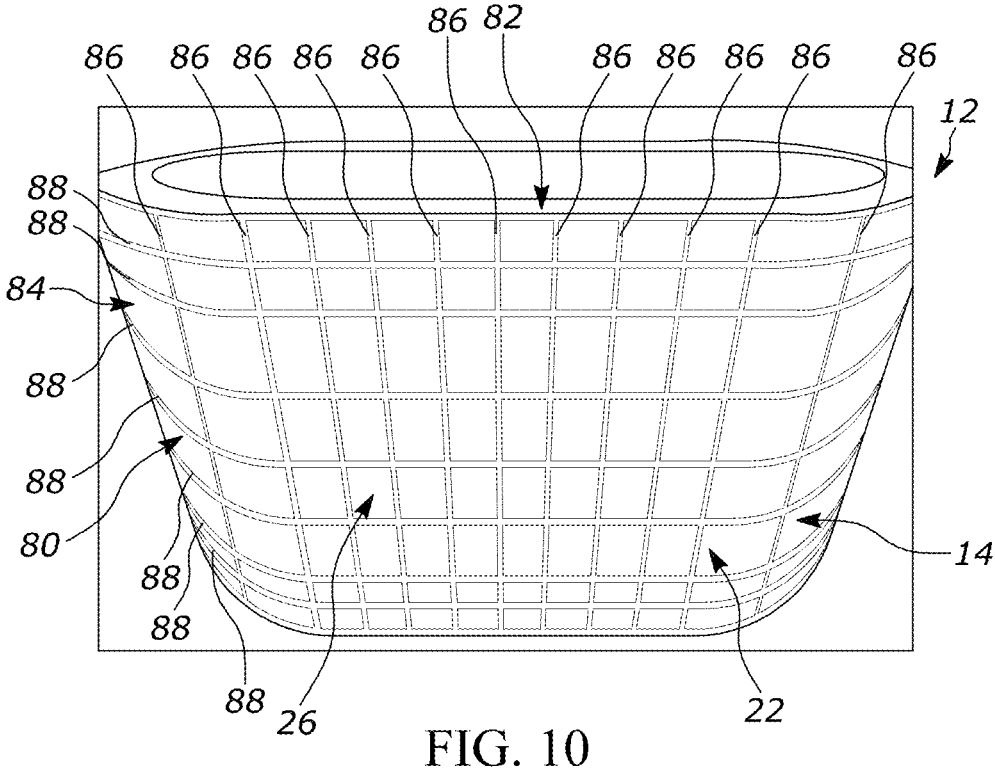
FIG. 10 is front view of the first shell member of the underground enclosure assembly of FIG. 1, depicting an outside surface of the first shell member.
Figure 11:
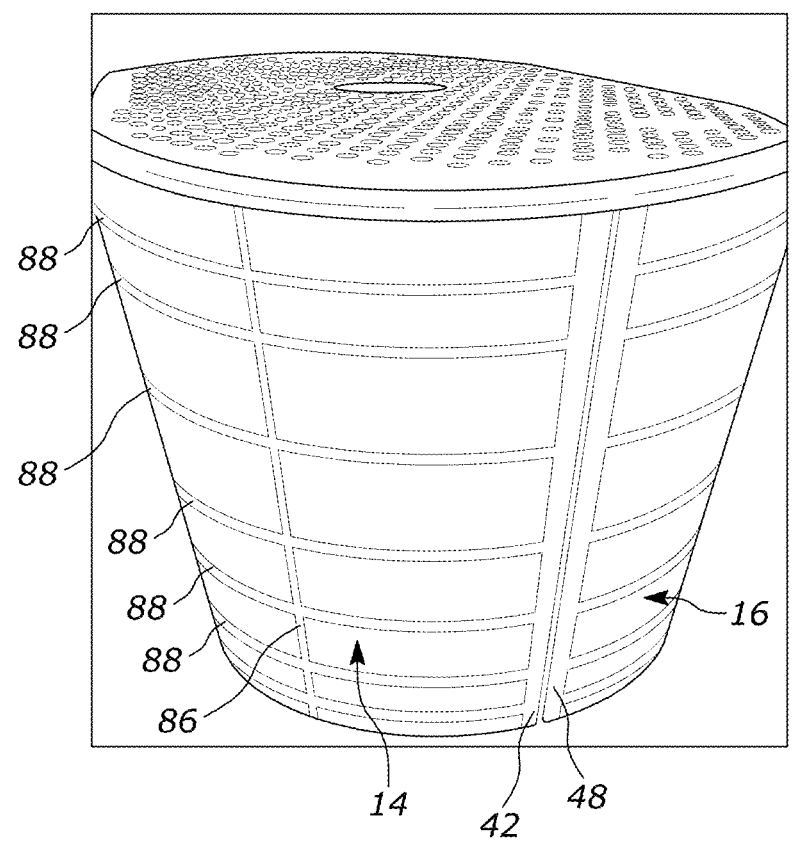
FIG. 11 is a side perspective view of a shell assembly of the underground enclosure assembly of FIG. 1.

Referring now to FIGS. 10 and 11, the outside wall 22 having the grid pattern 26 (see, e.g., FIG. 3) is depicted in FIG. 10. The grid pattern 26 includes a plurality of ribs 80 having a plurality if vertical ribs 82 and a plurality of horizontal ribs 84. In this example, the plurality of vertical ribs 82 includes at least eleven ribs 86, and the plurality of horizontal ribs 84 includes at least seven ribs 88. At least one vertical rib 86 of the plurality of vertical ribs 82 intersects at least one horizontal rib 88 of the plurality of horizontal ribs 84, as depicted in FIG. 10, for example. The grid pattern 26 reinforces the structural integrity the first shell member 14. In addition, and as depicted in FIG. 11, while some vertical ribs 86 are depicted relatively equidistantly from each other, the vertical rib 86 depicted closest to the side edge 42 of the first shell member 14, for example, is disposed a greater distance from the side edge 42 than from another vertical rib 86 disposed on the outside wall 22 of the first shell member 12. So configured, some vertical ribs 86 are depicted the same distance from each other, while other vertical ribs 86 are disposed from each other at a greater distance.

Figure 12:
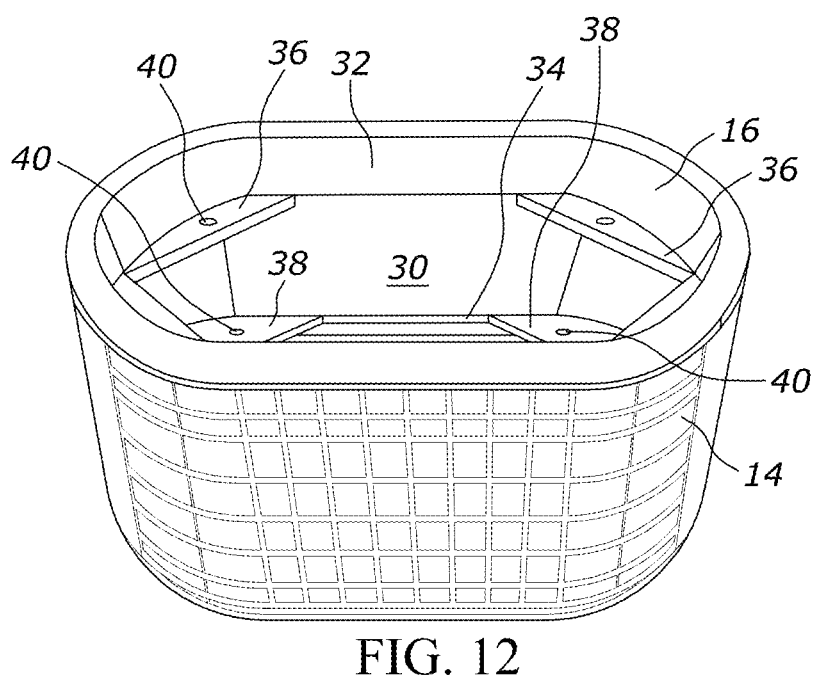
FIG. 12 is an perspective view of an inside wall of a second shell member.

Referring now to FIG. 12, the inside wall 30 of the shell member 16 is depicted, Like the inside wall 30 of the shell member 14, the inside wall 30 of the second shell member 16 also includes a top portion 32, a bottom portion 34, an upper shelf 36 disposed near the top portion 32 of the inside wall 30, and a lower shelf 38 disposed near a bottom portion 34 of the inside wall 30. Each of the upper shelf 36 and the lower shelf 38 includes an aperture 40.

Figure 13:
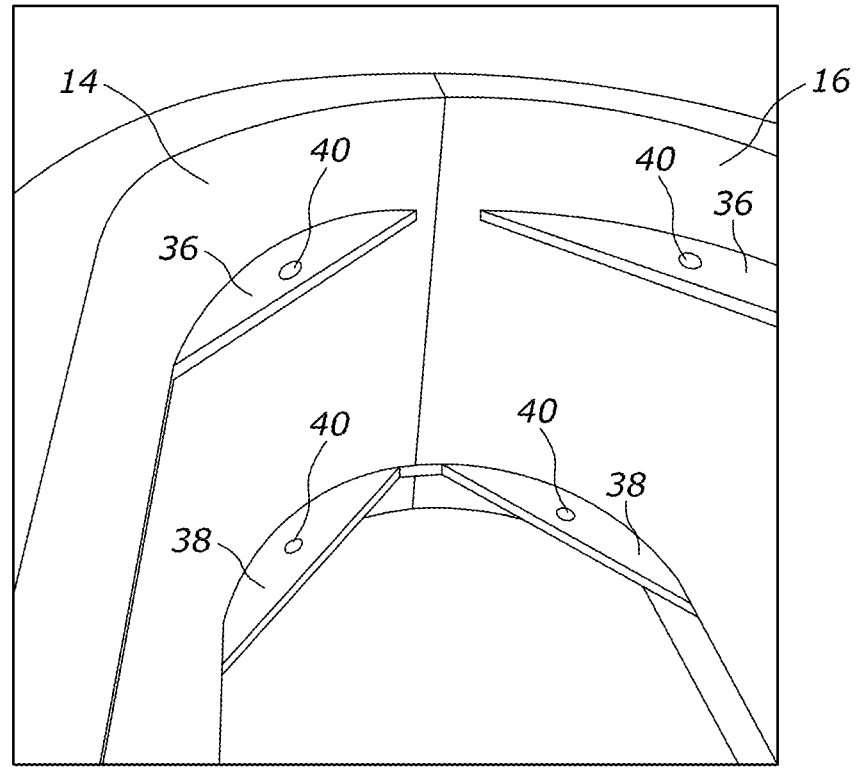
FIG. 13 is a perspective view of a portion of an inside wall of the first shell member and a portion of the inside wall of the second shell member.

FIG. 13 depicts a portion of each of the first and second shell members, with a portion of the inside wall 30 of each shell member 14, 16 depicted. While the parts of the shell members 14, 16 are best depicted relative to the shell member 14, e.g., the first shell member 14, of FIG. 3, it will be appreciated that the same parts are also included on the shell member 16, e.g., the second shell member 16.

Figure 14:
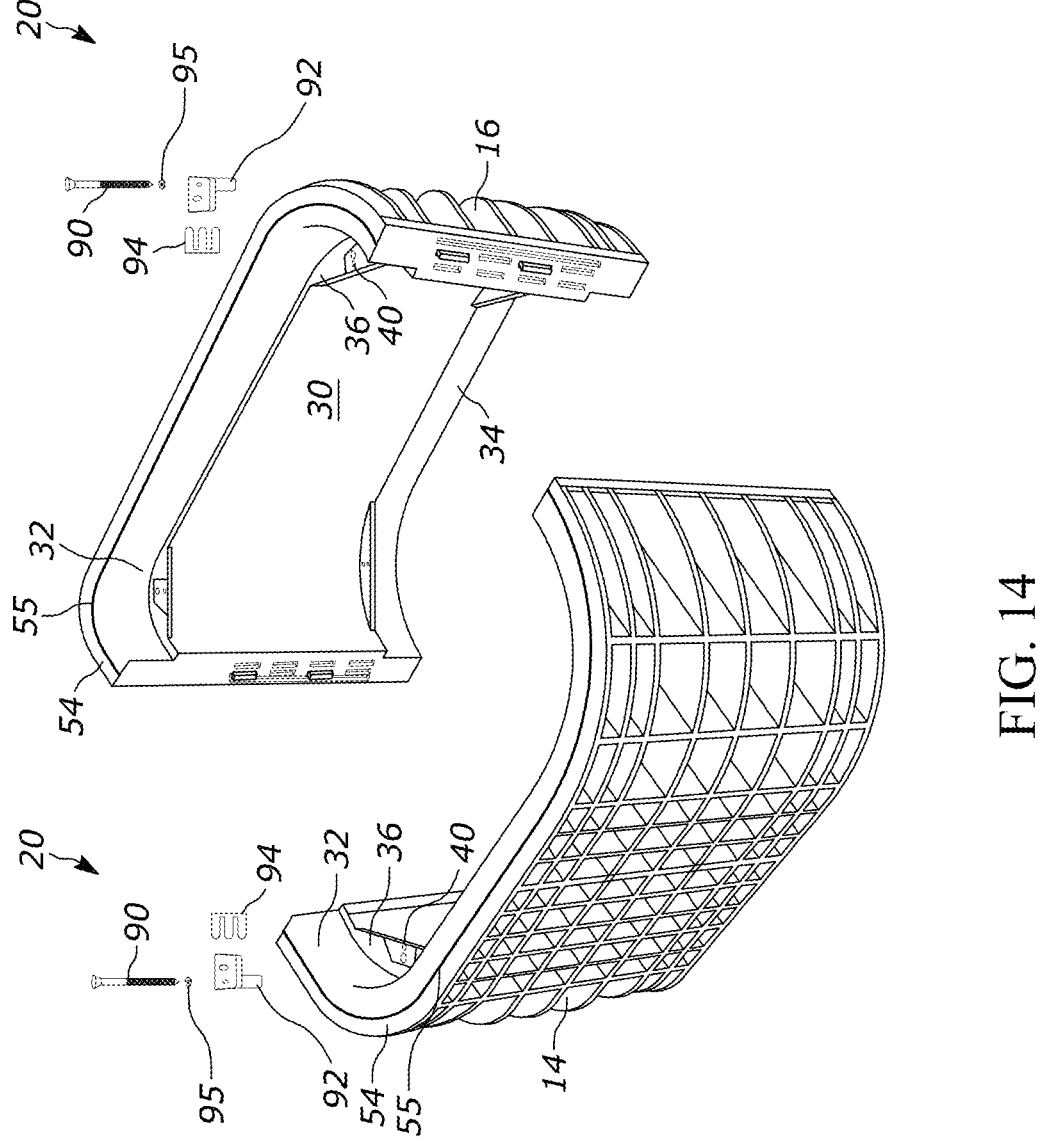
FIG. 14 is an exploded view of a bolt assembly and the two shell members of the underground enclosure assembly of the present disclosure.
Figure 15:
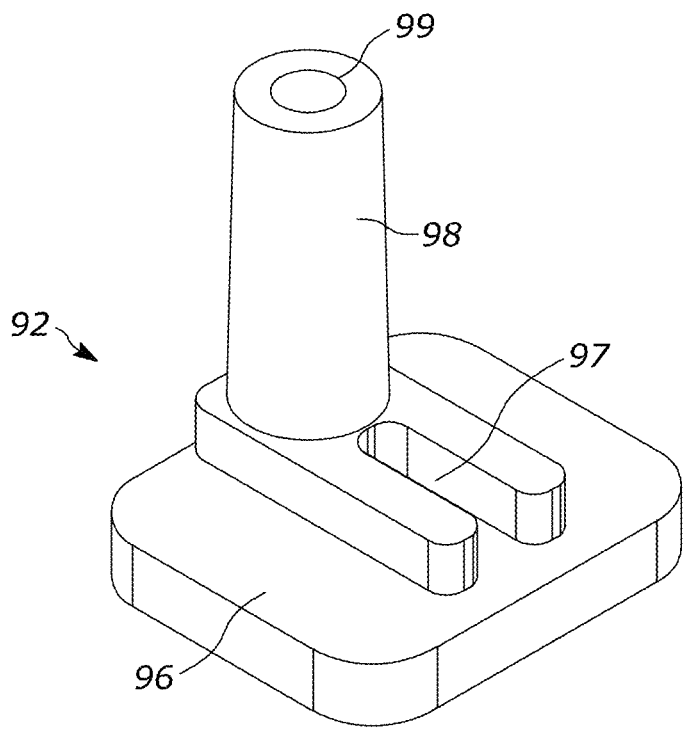
FIG. 15 is a perspective view of a retainer nut of the bolt assembly of the FIG. 14.
Figure 16:
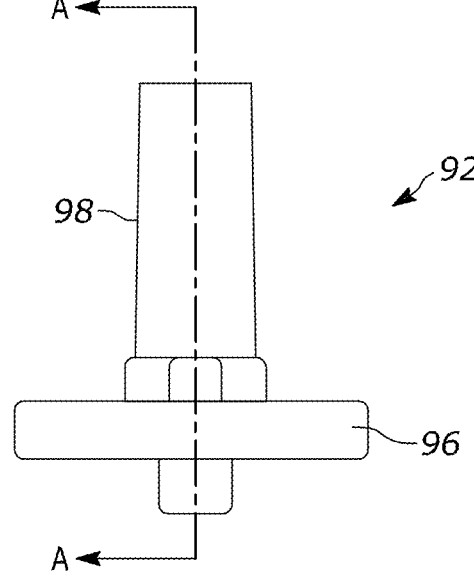
FIG. 16 is a rear view of the retainer nut of FIG. 15.
Figure 17:
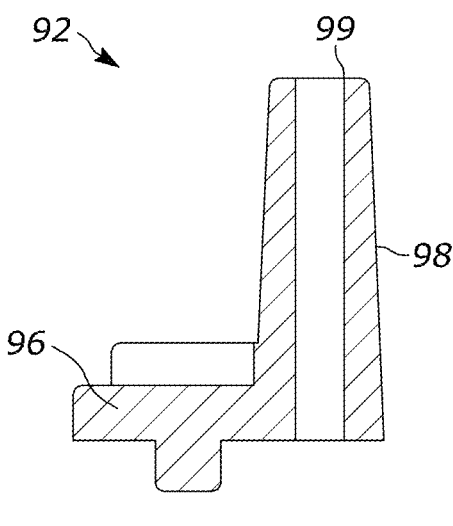
FIG. 17 is a cross-sectional view of the retainer nut taken along the line A-A of FIG. 16.

Referring now to FIGS. 14-17, the bolt assembly 20 referred to above is depicted. As explained above, a portion of the two bolt assemblies 20 is configured to be disposed through the apertures 58 (FIG. 4) of the lid 18 and then through the apertures 40 of the upper shelf 36 of each shell member 14, 16 to secure the lid 18 to the shell assembly 12. More specifically, each bolt assembly 20 includes a bolt 90, a retainer nut 92, such as an anchor nut, that receives the bolt 90, and a clip 94, such as a spring clip. The bolt 90 may include a lag bolt or any other similar type of bolt. In one example, the bolts 90 are two ⅜" dia lag bolts made of stainless steel. The clip 94 secures the retainer nut 92 to the upper shelf 36 of each of the first shell member 14 and the second shell member 16. Each bolt assembly 20 further includes a washer 95 that is disposed between the bolt 90 and the retainer nut 92 and made of stainless steel, in one example. Further, the retainer nut 92 includes a base 96, a slot portion 97 coupled to an underside of the base 96, and cylindrical projection 98 having a bore 99 for receiving the bolt 90, as depicted in FIGS. 15-17.

So configured, the cylindrical projection 98 of the retainer nut 92 is first disposed into the aperture 40 of the upper shelf 36 of one of the first shell member 14 or the second shell member 16. A portion of the clip 94 is then inserted into the slot portion 97 of the retainer nut to secure, e.g., clip, the retainer nut 92 to the first shell member 14 or the second shell member 16. The washer 95 is then disposed on an top surface of the base 96, such that it surrounds the bore 99. The bolt 90 is then inserted into the aperture 58 of the lid, then into the bore 99 of the retainer nut 92, which is disposed within the aperture 40, and the washer 95 helps secure the bolt 90 to the retainer nut 92.

As also depicted in FIG. 14, each of the first and second shell members 14, 16 further includes a mating lip 55 disposed on the top surface 54 (see also FIG. 3) of the first and second shell members 14, 16. The mating lip 55 is configured to be inserted into a groove on the underside of the lid 18, as explained more below. So configured, the lid 18 covers each of the first and second shells 14, 16, such as the top surface 54 of each of the first and second shell members 14, 16, when the lid 18 is coupled to the shell assembly 12. This prevents water from accumulating between the lid 18 and the first and second shell members 14, 16 and freezing, which makes removal of the lid extremely difficult in winter conditions, for example. While not depicted in FIG. 14, each of the first and second shell members 14, 16 also includes a bottom surface having the mating lip 55, which is also configured to be inserted into the groove on the underside of the lid 18. The bottom surface of the lid 18 is identical to the top surface 54 of the lid 18 and thus includes this same mating lip. As a result, the first and second shell members 14, 16 are reversible, and either the top surface 54 or the bottom surface of the first and second shell members 14, 16 may face upwardly such that the lid 18 may be coupled to either the top surface or the bottom surface of the shell members 14, 16, depending upon their orientation. So configured, the underground enclosure assembly 10 is easier and more efficient to both manufacture and install in the field, for example, than conventional designs.

Figure 18:
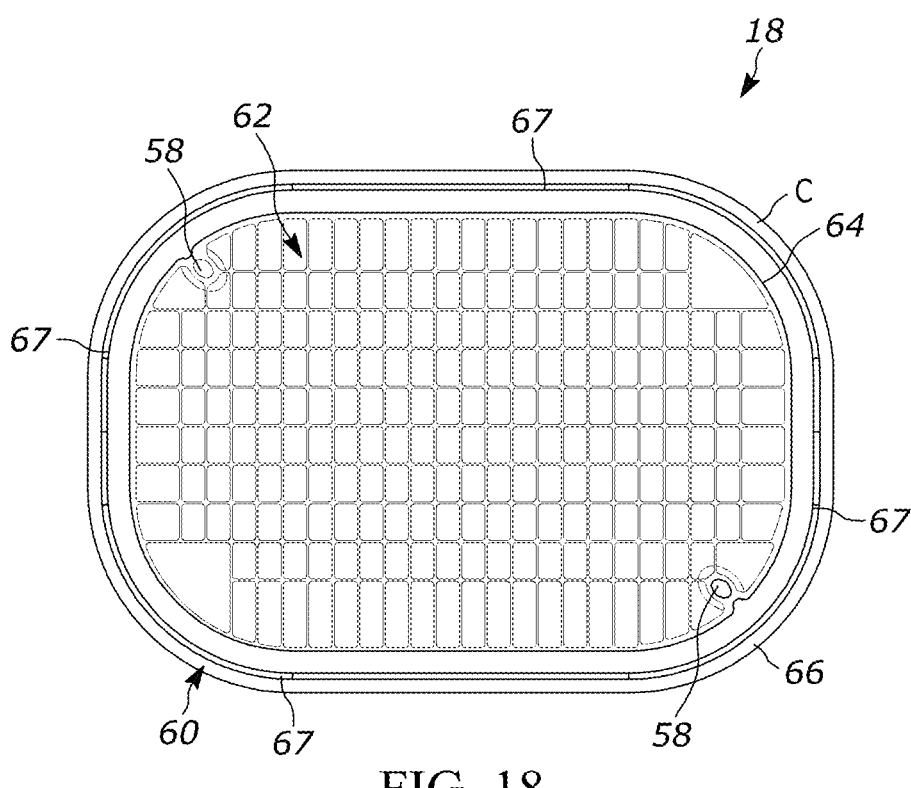
FIG. 18 is another bottom view of the lid of the underground enclosure assembly of the present disclosure.

Referring now to FIG. 18, another bottom view of the lid 18 of the underground enclosure assembly 10 is depicted. The lid 18 includes the underside 60 having the plurality of ribs 62 and the flange 64 extending downwardly from the rim portion 6, as previously noted relative to FIG. 5, for example. In addition, the underside 60 also includes a groove 67 that extends around the circumference C of the lid and the rim portion 66. The groove 67 helps align the lid 18 with the shell assembly 12 when the lid is coupled to the shell assembly 12. In addition, the groove 67 receives the mating lip 55 of either the top surface 54 of each of the first and second shell members 14, 16 or the bottom surface of each of the first and second shell members 14, 16, depending upon the orientation of the shell members 14, 16 (e.g., whether the bottom surface or the top surface is facing upwardly). In this way, the lid 18 covers the top surface 54 of the shell members 14, 16 and, thus, the shell assembly 12, preventing water from accumulating between the lid 18 and the shell members 14, 16 and freezing during harsh winter conditions. In another example, and as will be appreciated by those of skill in the art, the underside 60 of the lid 18 may alternatively include a raised portion, such as a mating lip, and one or more of the first and second shell members 14, 16 may include a recessed portion, such as a groove, that receives the raised portion, e.g., the mating lip, of the underside 60 of lid 18. This configuration also helps align the lid 18 with the shell assembly 12 and/or prevents water from accumulating between the lid 18 and the shell members 14, 16.

In addition, each of the first and second shell members 14, 16 and the lid 18 comprises HDPE material, molded through a process referred to as structural foam in one example, which is lighter than known composite and polymer concrete structures. In some example, the items will adhere to ANSI SCTE 77 2017 and all other requirements, such as HDPE coupled with known structural implements, for a Tier 22 rating. In one example, the shell assembly 12 of the underground enclosure assembly 10 includes a 24"×36"×24" opening. In another example, the shell assembly 12 of the underground enclosure assembly 10 has a 17"×30"×24" opening, which is also used in industry. Other sizes with same overall design may be produced and still fall within the scope of the present disclosure.

Figure 19:
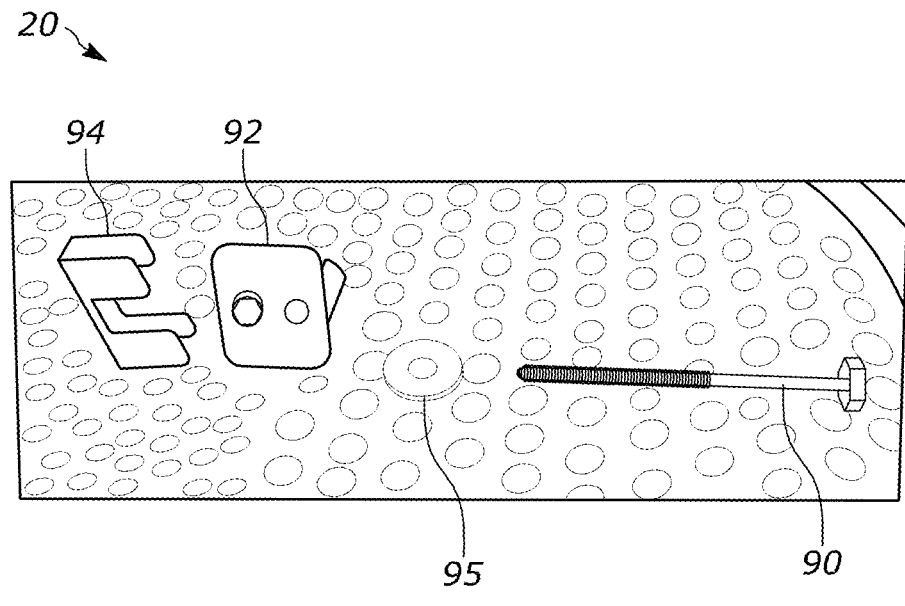
FIG. 19 is a front exploded view of the bolt assembly of FIG. 14.
Figure 20:
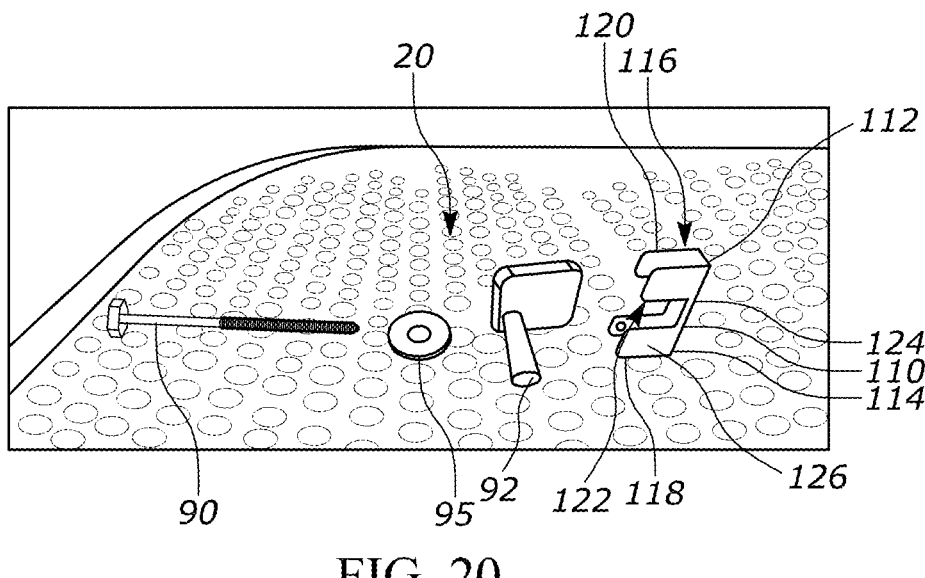
FIG. 20 is a rear exploded view of the bolt assembly of FIG. 19.
Figure 21:
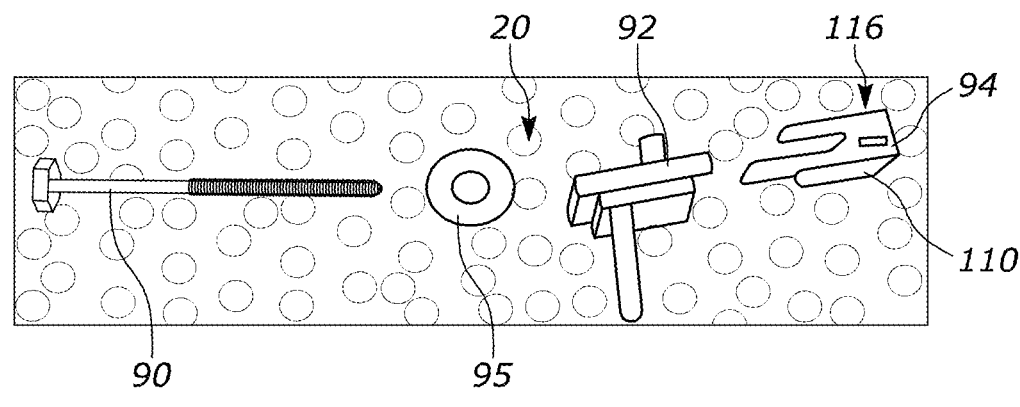
FIG. 21 is a top exploded view of the bolt assembly of FIG. 19.

Referring now to FIGS. 19-22, additional views of the bolt assembly 20 of the present disclosure are depicted. In particular, FIGS. 19-21 depict various exploded views of the components of the bolt assembly 20. In FIG. 19, a front exploded view of the bolt assembly 20 is depicted, illustrating a front view of the bolt 90, the retainer nut 92, such as an anchor nut, that receives the bolt 90, and the clip 94, such as the spring clip. The washer 95 is further depicted, and the washer 95 is configured to be disposed between the bolt 90 and the retainer nut 92.

As depicted in FIGS. 20 and 21, in this example the clip 94 includes a base 110 having a first end 112 and a second end 114 disposed opposite to the first end 112. A first pair of arms 116 extends from the first end 112, and a second pair of arms 118 extends from the second end 114. An aperture 120 is disposed between the first pair of arms 116, and the aperture 120 receives a portion of the base 96 of the retainer nut 92 when the bolt assembly 20 is in an assembled configuration. Further, a gap 122 is formed between the first and second pairs of arms 116, 118, and the gap 122 receives the cylindrical portion 98 of the retainer nut 92 in the assembled configuration.

Figure 22:
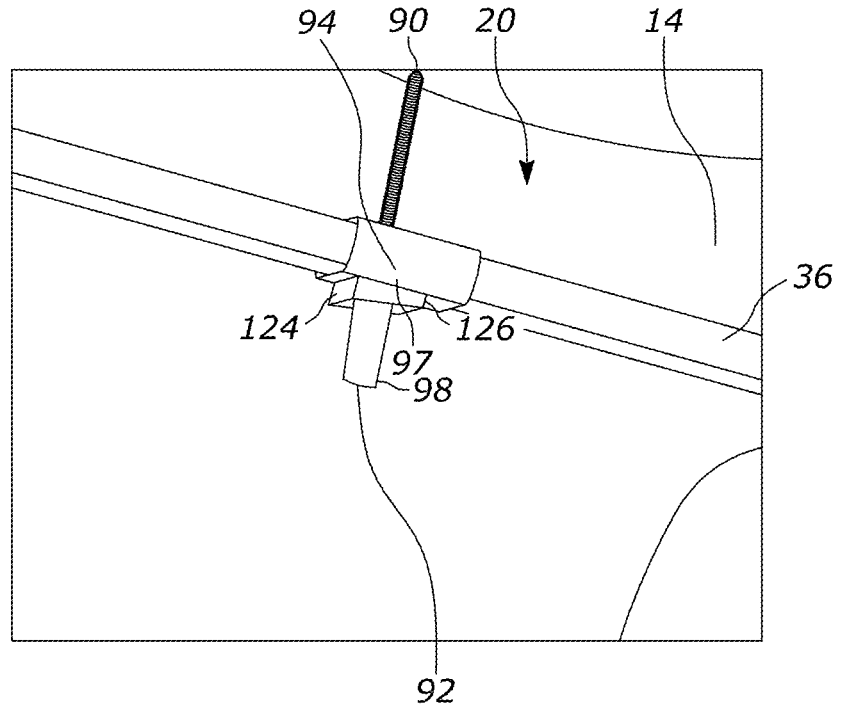
FIG. 22 is a close-up view of the bolt assembly coupled to a shelf of a shell member of the present disclosure.

Still further, the clip 94 includes a first securing member 124 extending from an arm of the first pair of arms 116, and a second securing member 126 extending from an arm of the second pair of arms 118, as depicted in FIG. 20. When the bolt assembly 20 is assembled, the first securing member 124 and the second securing member 126 are disposed on either side of the slot portion 97 of the retainer nut 92, as depicted in FIG. 22, to further secure the clip 94 to the retainer nut 92, for example. In one example, each of the first and second securing members 124, 126 outwardly extends from an arm of the first and second pair of arms 116, 118, and at an angle of approximately 90 degrees from a longitudinal axis X of the arms of the first and second pair of arms 116, 118. However, in another example the first and second securing members 124 and 126 extend outwardly at another angle and still fall within the scope of the present disclosure. In addition, the first and second securing members 124 and 126 are spring biased, such that they further secure the retainer nut 92 to the clip 94 when coupled thereto.

Further, a method of assembling the enclosure assembly 10 for telecommunications equipment of the present disclosure will be understood in view of the foregoing description of the underground enclosure assembly 10. Specifically, a method of assembling the enclosure assembly 10 includes providing the first shell member 14 having the at least one side edge 42, 44 with at least one snap projection 50 and a plurality of apertures 70. The method also includes providing the second shell member 16 having the at least one side edge 46, 48 also with the at least one snap projection 50 and the plurality of apertures 70. The method further includes snapping the at least one snap projection 50 of the first shell member 14 into one aperture 72 of the plurality of apertures 70 of the second shell member 16 to attach the first side edge 42, 44 of the first shell member 14 to the second side edge 46, 48 of the second shell member 16.

The method also includes rotating the second shell member 16 such that the at least one snap projection 50 of the first shell member 14 is disposed in one aperture 72 of the plurality of apertures 70 of the second shell member 16 to couple the first and second shell members 14, 16 together and form the shell assembly 12. The method still further includes coupling the lid 18 to the shell assembly 12 via the at least two bolt assemblies 20, with the lid 18 including the underside with the plurality of ribs and the flange extending downwardly from the rim portion of the lid 18.

In some examples, coupling the lid 18 to the shell assembly 12 via the at least two bolt assemblies 20 comprises disposing the rim portion of the lid 18 on the top surface 54 of each shell member 14, 16. In addition, coupling the lid 18 to the shell assembly 12 via the at least two bolt assemblies 20 comprises inserting a mating lip on the top surface of each shell member of the two shell members 14, 16 into a groove disposed on the underside of the lid 18, such that the lid 18 covers the top surface 54 of each shell member 14, 16. In another example, the method may further comprise, before snapping the at least one snap projection 50 of the first shell member 14 into the aperture 72 of the plurality of apertures 70 of the second shell member 16, coupling the retainer nut 92 to each of the two shell members 14, 16 of the shell assembly 12. In addition, coupling the lid 18 to the shell assembly 12 via the at least two bolt assemblies 20 may comprise disposing the bolt 90 of each bolt assembly 20 through the aperture 58 disposed on the lid 18 and into the retainer nut 92 of each shell member 14, 16 to secure the lid 18 to the shell assembly 12.

Figure 23:
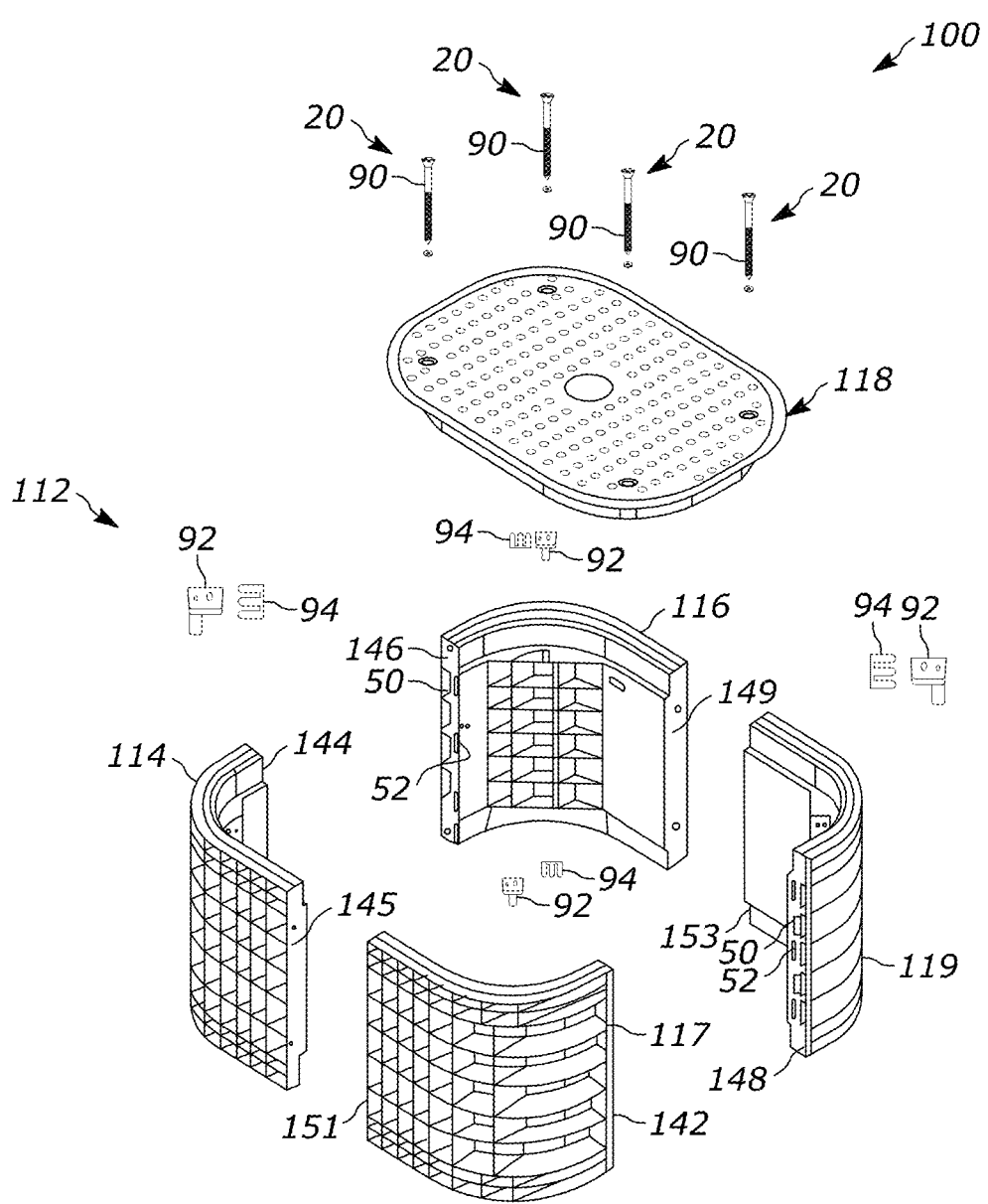
FIG. 23 is an exploded view of another underground enclosure assembly of the present disclosure.

Referring now to FIG. 23, another underground enclosure assembly 100 for telecommunications equipment according to the present disclosure is depicted. In this example, the at least two shell members includes four shell members, and the four shell members includes a first shell member, a second shell member, a third shell member, and a fourth shell member. Each of the first, second, third and fourth shell members includes all of the same features and elements of the first and second shell members described throughout the detailed description and described more below unless indicated otherwise herein. Specifically, parts of the underground assembly 100 that are the same as parts of the underground assembly 10 include the same reference numbers and are not explained again here for the sake of brevity.

As depicted in FIG. 23, the underground enclosure assembly 100 includes a shell assembly 112 with at least two shell members that are coupled to each other via the at least one snap projection described above. The underground enclosure assembly 100 also includes a lid 118 removably coupled to the shell assembly 112 via at least two bolt assemblies 20. In some examples, and as depicted in FIG. 23, the lid 118 is removably coupled to the shell assembly 112 via four bolt assemblies 20.

In this example, the at least two shell members includes four shell members, and the four shell members includes a first shell member 114, a second shell member 116, a third shell member 117, and a fourth shell member 119. Each shell member 114, 116, 117, 119 of the shell assembly 112 may include side edges. Specifically, the first shell member 114 may include a first side edge 144 and a second side edge 145 disposed on a side of the first shell member 114 opposite to the first side edge 141, for example. In addition, and in the same manner as the first shell member 114, the second shell member 116 may include a first side edge 146 and a second side edge 149. In this example, the first side edge 144 of the first shell member 114 is coupled to the first side edge 146 of the second shell member 116 when the first shell member 114 is coupled to the second shell member 116 and the underground enclosure assembly is in an assembled state, for example. In addition, the third shell member 117 of the shell assembly 112 includes a first side edge 142 and a second side edge 151, and the fourth shell member 119 includes a first side edge 148 and a second side edge 153. So configured, the first side edge 142 of the third shell member 117 is coupled to the first side edge 148 of the fourth shell member 119 when the underground enclosure assembly 100 is in an assembled state. In addition, the second side edge 145 of the first shell member 114 is coupled to the second side member 151 of the third shell member 117, and the second side edge 149 of the second shell member 116 is coupled to the second side edge 153 of the fourth shell member 119 when the shell assembly 112 is in the assembled state.

Like the first and second shell members 14, 16 of the underground enclosure assembly 10 described above, the first side edges 144, 146, 142, and 148 of the first, second, third and fourth shell members 114, 116, 117, and 119, respectively, of the underground enclosure assembly 100 each includes at least one snap member, such as the snap projection 50, and the at least one aperture 52. Although not depicted for the first side edges 144 and 142 of the first and third shell members 114, 117 of FIG. 23, each of the first side edges 144, 142 of the first and third shell members likewise includes the at least one snap member, such as the snap projection 50, as explained more below. So configured, the at least one snap projection 50 snaps into the at least one aperture 52 of a corresponding first side edge of the shell member in the same manner described above relative to the underground enclosure assembly 10. In addition, each of the first shell member 114, the second shell member 116, the third shell member 117, and the fourth shell member 119 includes the top surface 54 on which a rim portion of the lid 118 is disposed, like the underground enclosure assembly 10 described above.

Figure 24:
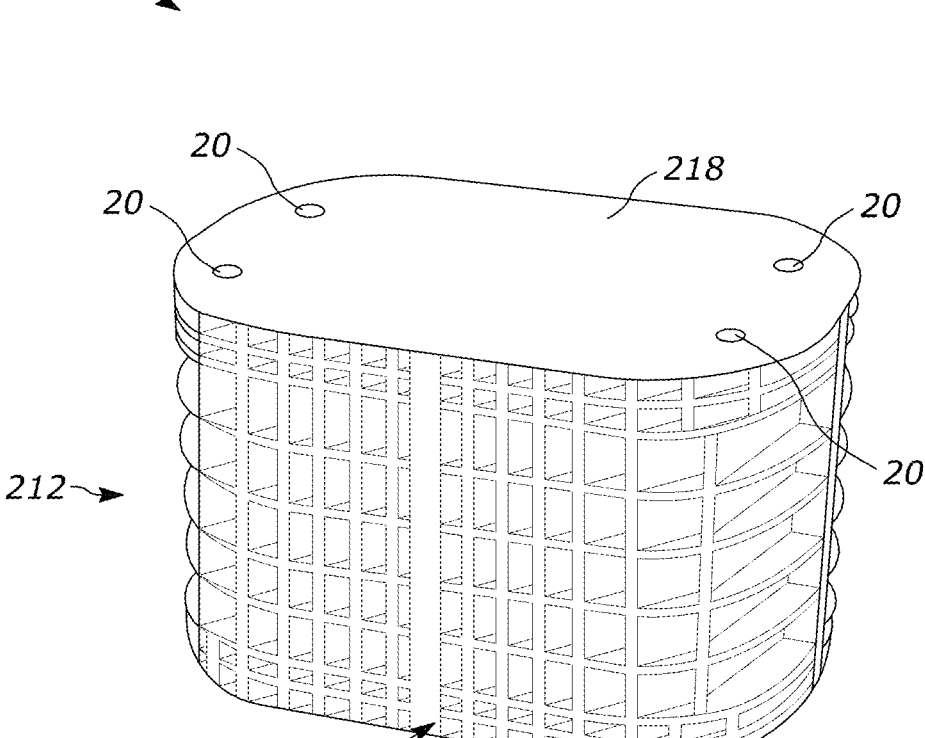
FIG. 24 is perspective view of yet another underground enclosure assembly of the present disclosure.

Referring now to FIG. 24, another underground enclosure assembly 200 according to the present disclosure is depicted. The underground enclosure assembly 200 includes all of the same parts and features as the underground enclosure assembly 10 except for some additional features. Namely, the underground enclosure assembly 200 includes a lid where the at least two bolt assemblies include four bolt assemblies configured to couple the lid to the shell assembly. In addition, the shell assembly of the underground enclosure assembly 200 further includes a brace assembly and the lid further includes a lid support, all of which are explained more below. Any parts of the underground enclosure assembly 200 that are the same as the underground enclosure assembly 10 include either the same reference number or a reference number two hundred more than the same reference number of the underground enclosure assembly 200 and are not explained again here for the sake of brevity.

Figure 25:
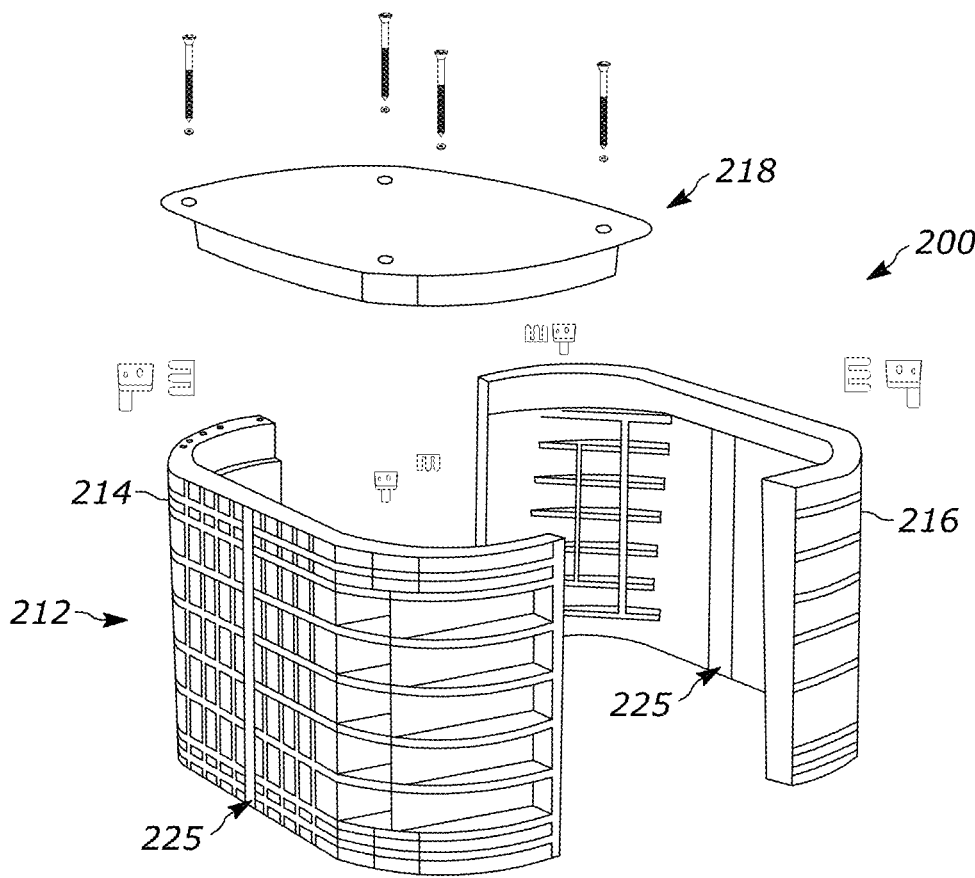
FIG. 25 is an exploded view of the underground enclosure assembly of FIG. 24.
Figure 26:
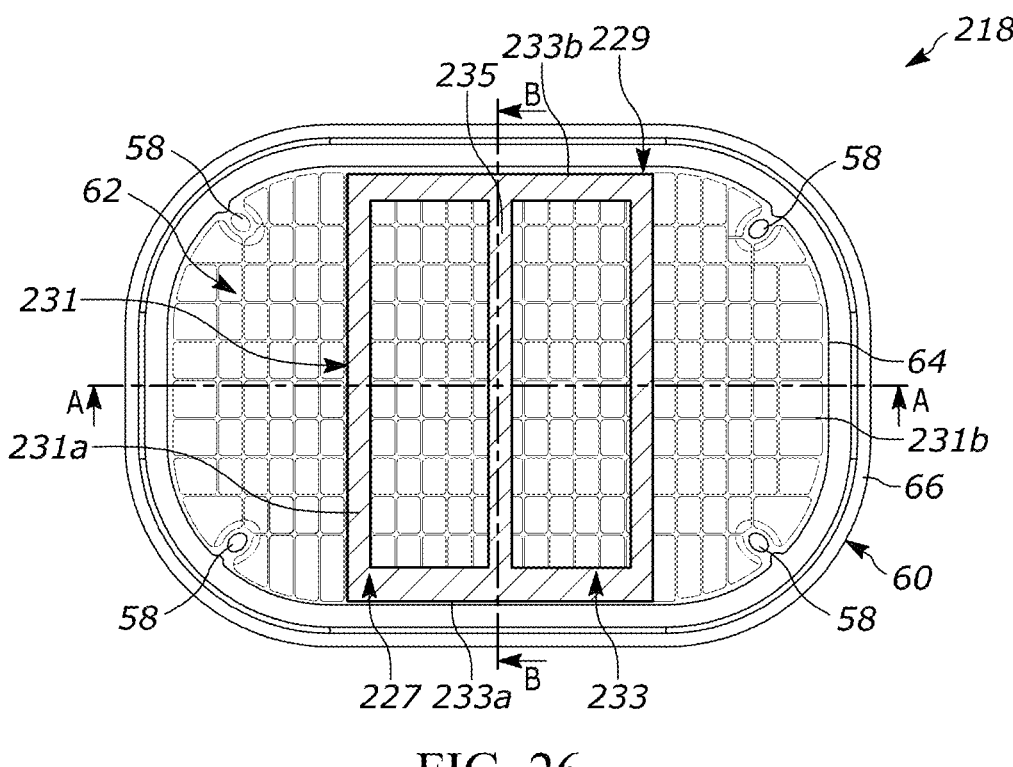
FIG. 26 is a bottom view of a lid of the underground enclosure assembly of FIG. 24.
Figure 27:
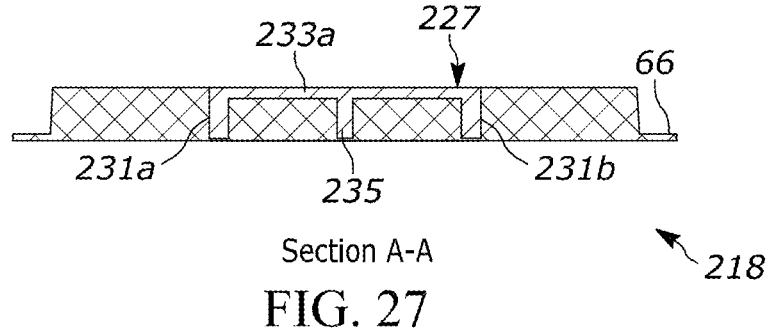
FIG. 27 is a sectional view of the lid of FIG. 26.
Figure 28:
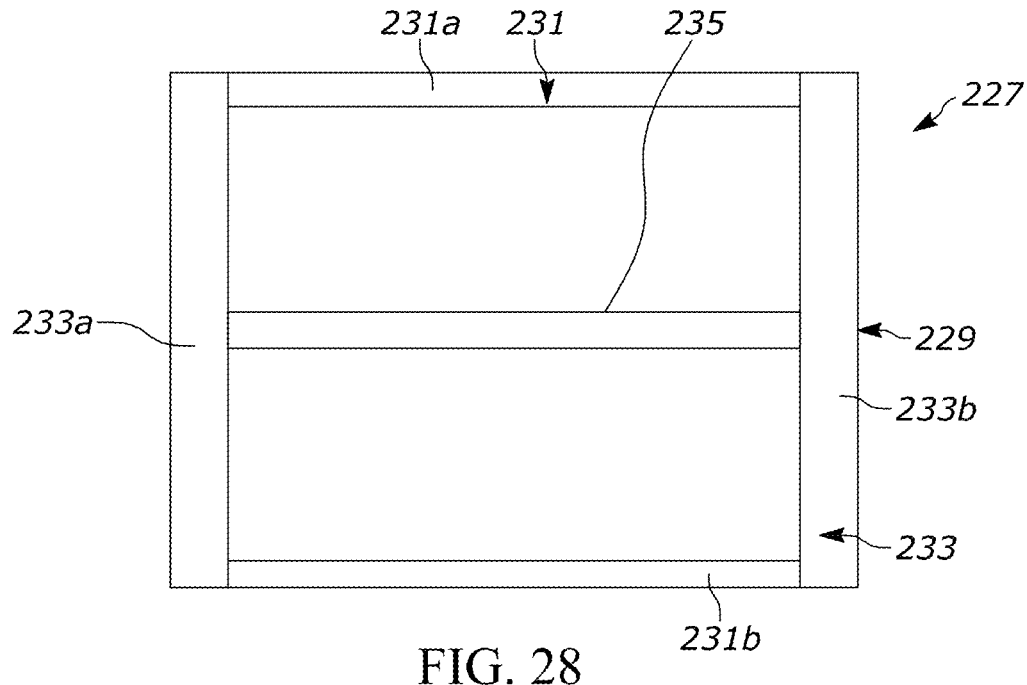
FIG. 28 is a top view of a lid support of FIG. 26.
Figure 29:
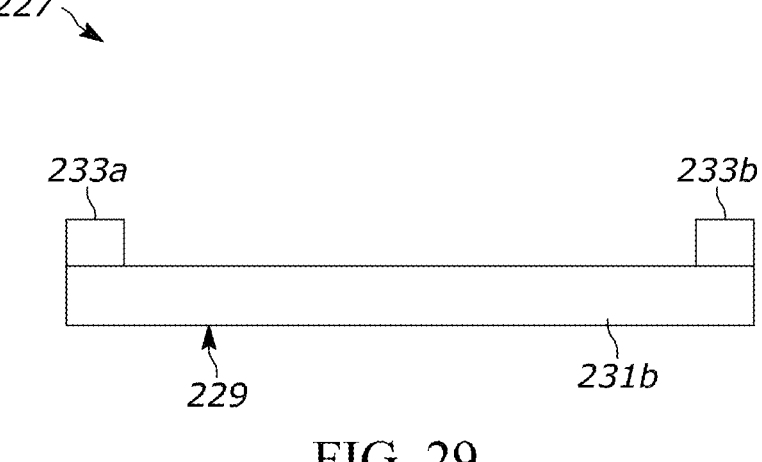
FIG. 29 is a front view of the lid support of FIG. 28.
Figure 30:
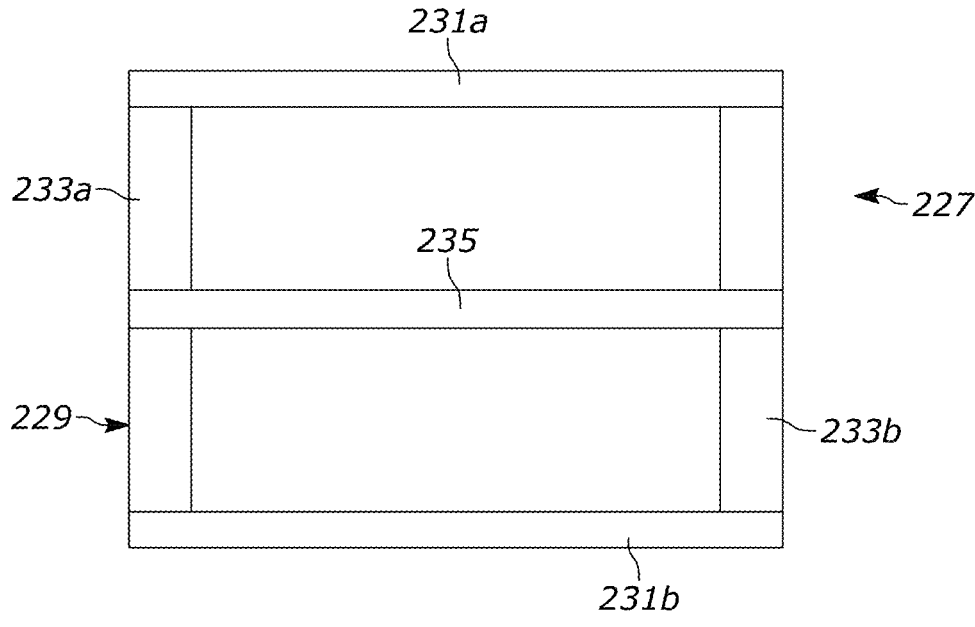
FIG. 30 is a bottom view of the lid support of FIG. 28.
Figure 31:
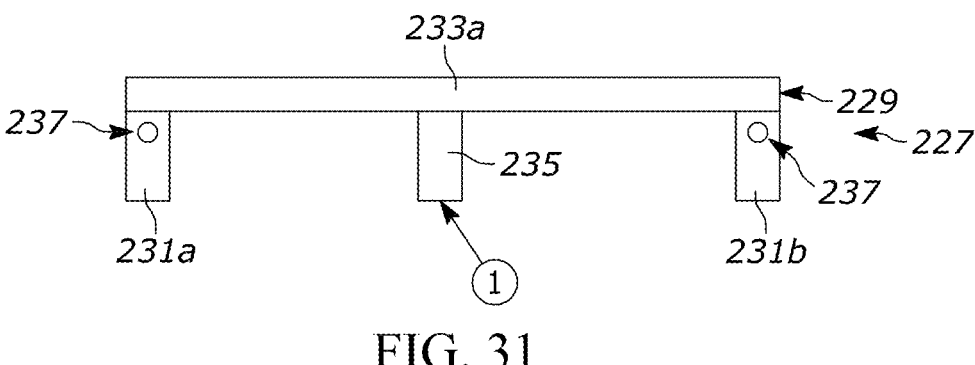
FIG. 31 is a side view of the lid support of FIG. 28.
Figure 32:
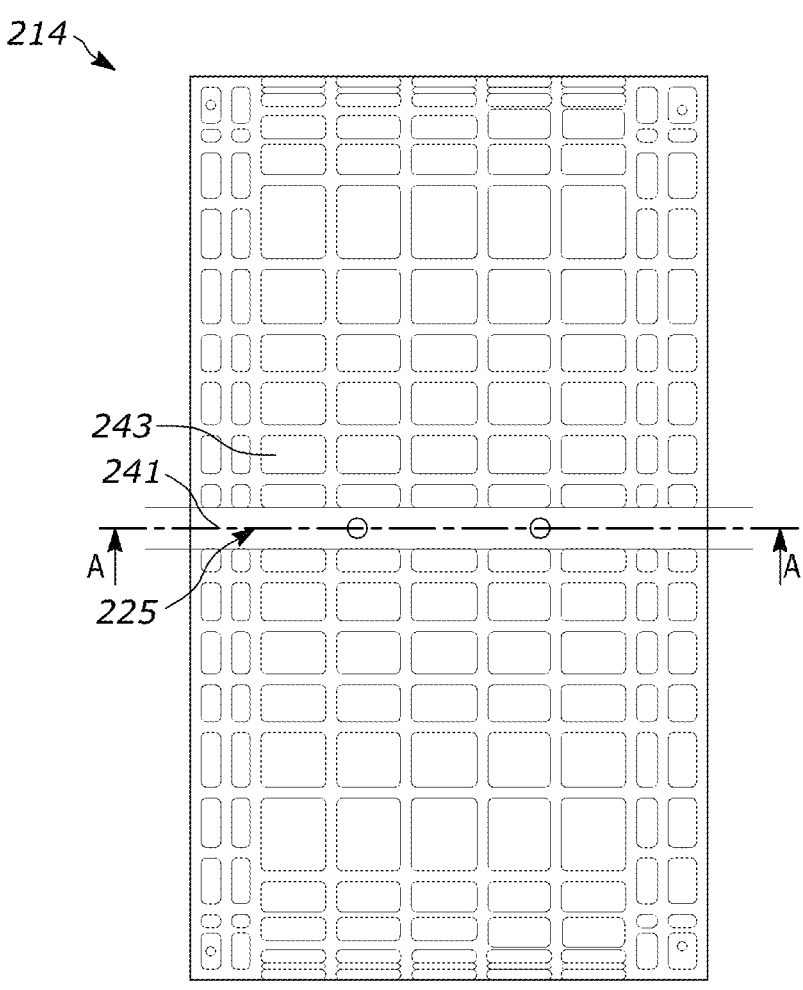
FIG. 32 is a side view of a shell member of the underground enclosure assembly of FIG. 24.

As depicted in FIGS. 24 and 25, the underground enclosure assembly 200 includes a shell assembly 212 with at least two shell members 214, 216 coupled to each other via the at least one snap projection and a lid 218 removably coupled to the shell assembly 212 via at least two bolt assemblies 20, as described above. In this example, each of the first shell member 214 and the second shell member 216 includes a brace assembly 225, as explained more below.

Referring now to FIGS. 26-31, the lid 218 also includes a lid support 227 disposed on the underside 60 of the lid 218. Generally, the lid support 227 essentially includes an internal frame for structural support of Tier 15 and 22 underground enclosure assembly units, for example, and explained more below. Like the lid 18 of the underground enclosure assembly 10, the lid 218 also includes the underside 60 having the plurality of ribs 62 and a flange 64 extending downwardly from the rim portion 66 of the lid 218. The lid support 227 includes a frame 229 having a pair of side bars 231, a pair of end bars 233 coupled to the pair of side bars 231, and an internal support bar 235 disposed between the pair of side bars and coupled to each end of the pair of end bars 233. The pair of side bars 231 includes a first side bar 231*a* and a second side bar 231*b* disposed parallel to the first side bar 231*a*, and the pair of end bars 233 includes a first end bar 233*a* and a second end bar 233*b* disposed parallel to the first end bar 233*a*. In addition, each side bar 231*a*, 231*b* of the pair of side bars 231 includes an aperture 237 for receiving a fastening member configured to couple the side bars 231*a*, 231*b* of the frame 229 to the lid 218. In one example, the fastening member is a ⅜-13 UNC bolt that fits into the aperture 237, e.g., the tapped hole, in the frame 229. In one example, each side bar 231*a*, 231*b* is a 1×2×22 support bar, and each end bar 233*a*, 233*b* is a 1×2×16 support bar. In addition, in this example, the internal bar support bar 235 is a 1×2×22 support bar, for example. Other sizes may alternatively be used and still fall within the scope of the present disclosure. In addition, each of the pair of side bars 231, the pair of end bars 233, and the internal support bar 235 may comprise aluminum or aluminum based material and be coupled to the lid 218 via screws or bolts, for example. In another example, each of the pair of side bars 231, the pair of end bars 233, and the internal support bar 235 may comprise one or more of basalt, aluminum, fiberglass, high density polyethylene (HDPE), or other plastic material at least in part or full and/or any combination thereof. In addition, in another example, the entire underground enclosure assembly 10, 100, 200 comprises one or more of aluminum, basalt, fiberglass, HDPE, or other plastic material at least in part or full.

Figure 33:
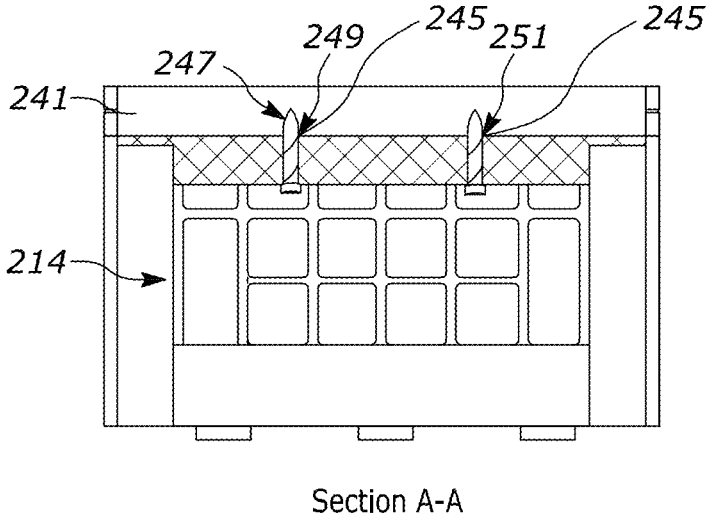
FIG. 33 is a sectional view of the shell member of FIG. 32.
Figure 34:
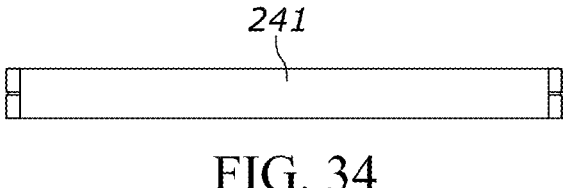
FIG. 34 is a top view of a brace of the shell member of FIG. 33.
Figure 35:
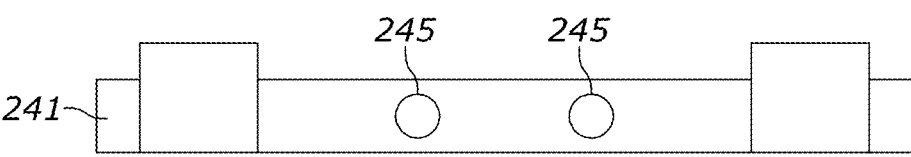
FIG. 35 is bottom view of the brace of FIG. 34.
Figure 36:
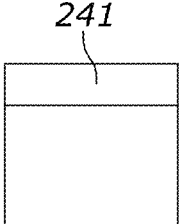
FIG. 36 is a side view of the brace of FIG. 34.

Referring now to FIGS. 32-38, the brace assembly 225 is depicted disposed on the first shell member 214 of the shell assembly 212. The brace assembly 225 includes a support channel 241 disposed on an outside surface 243 of the first shell member 214. In one example, the support channel 241 may include a 2×2×23 C-channel. The support channel 241 includes two apertures 245 (FIGS. 33 and 35) that each receive a screw 247 and a locknut 249 is used to secure the screw 247, such that the support channel 214 is secured coupled to the first shell member 214. In one example, the screw 247 and the locknut 249 are ½-16 UNC bolts/nut-nylon design. Other examples may alternatively and/or additionally be used and still fall within the scope of the present disclosure. A washer 251 may also be used to help secure the support channel 241 to the first shell member 214, as depicted in FIG. 33, for example. The support channel 241 may have a C-shape, as depicted in FIG. 36, for example. However, it will be appreciated that the support channel 241 may take the form of other shapes and still fall within the scope of the present disclosure. Generally, the brace assembly 225 provides lateral support for the underground enclosure assembly 200 on its side and when loaded, for example, and acts as a horizontal brace in one example for Tier 15 and 22 enclosure assembly unit ratings.

Figure 37:
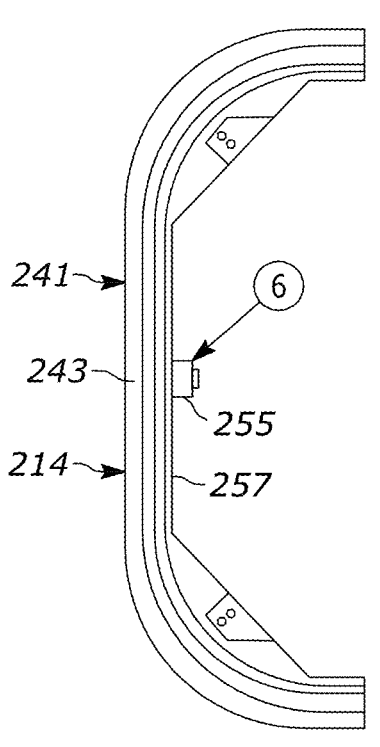
FIG. 37 is a top view of the shell member of FIG. 32.
Figure 38:
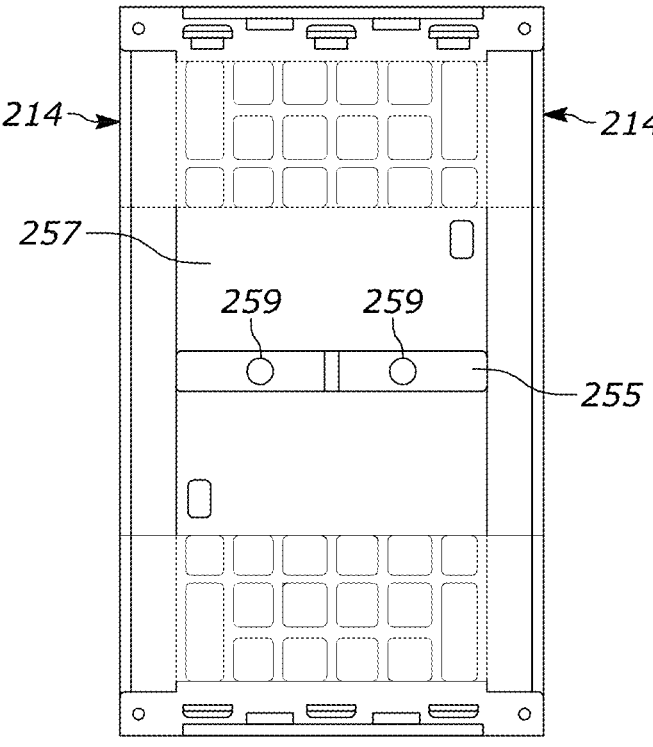
FIG. 38 is a side view of the shell member of FIG. 32.

Referring now to FIGS. 37 and 38, the brace assembly 225 further includes a support bar 255 disposed on an inside surface 257 of at least one shell member, such as the first shell member 214 depicted. The support bar 255 is aligned with the support channel 241 disposed on the outside surface 243 of the first shell member 214 of the shell assembly 212. The support bar 255 includes at least one aperture 259, and in this example, two apertures 259 configured to receive a fastener configured to couple the support bar 255 to the inside surface 257 of the first shell member 214. The fastener may be the screw 247 and locknut 249, for example, and may take other forms and still fall within the scope of the present disclosure. In addition, the support channel 241 and the support bar 255 comprise aluminum material, such as 6061 Aluminum. In another example, the support channel 241 and the support bar 255 comprise one of basalt or fiberglass at least in part. In addition, any of the aluminum parts of the assembly may be made with plastic, such as HDPE, fiberglass or basalt.

While the brace assembly 225 is depicted disposed on the first shell member 214, it will be appreciated that the brace assembly 225 may alternatively and/or additionally be disposed on the second shell member 216 and still fall within the scope of the present disclosure. In addition, while also not depicted in the underground disclosure assembly 100 of FIG. 23, it will be further appreciated that the brace assembly 225 may be disposed on one or more of the first, second, third, and fourth shell members 114, 116, 117, and 119 and still fall within the scope of the present disclosure. For example, the support channel 241 of the brace assembly 225 may be disposed on the seam formed between the ends 145 and 151 of the first shell member 114 and the third shell member 117 when the underground enclosure assembly 100 of FIG. 23 is in an assembled state. In a similar manner, the support channel 241 may be disposed on other seams of the enclosure assembly 100 formed between side edges of one or more other shell members of the enclosure assembly 100 and still fall within the scope of the present disclosure. Moreover, the lid 118 of the enclosure assembly 100 may further include the lid support 227 as described above relative to the enclosure assembly 200 and still fall within the scope of the present disclosure. More generally, each of the enclosure assemblies 100, 200 disclosed herein may include one or more of the lid support 227 and the brace assembly 225 as described herein.

Figure 39:
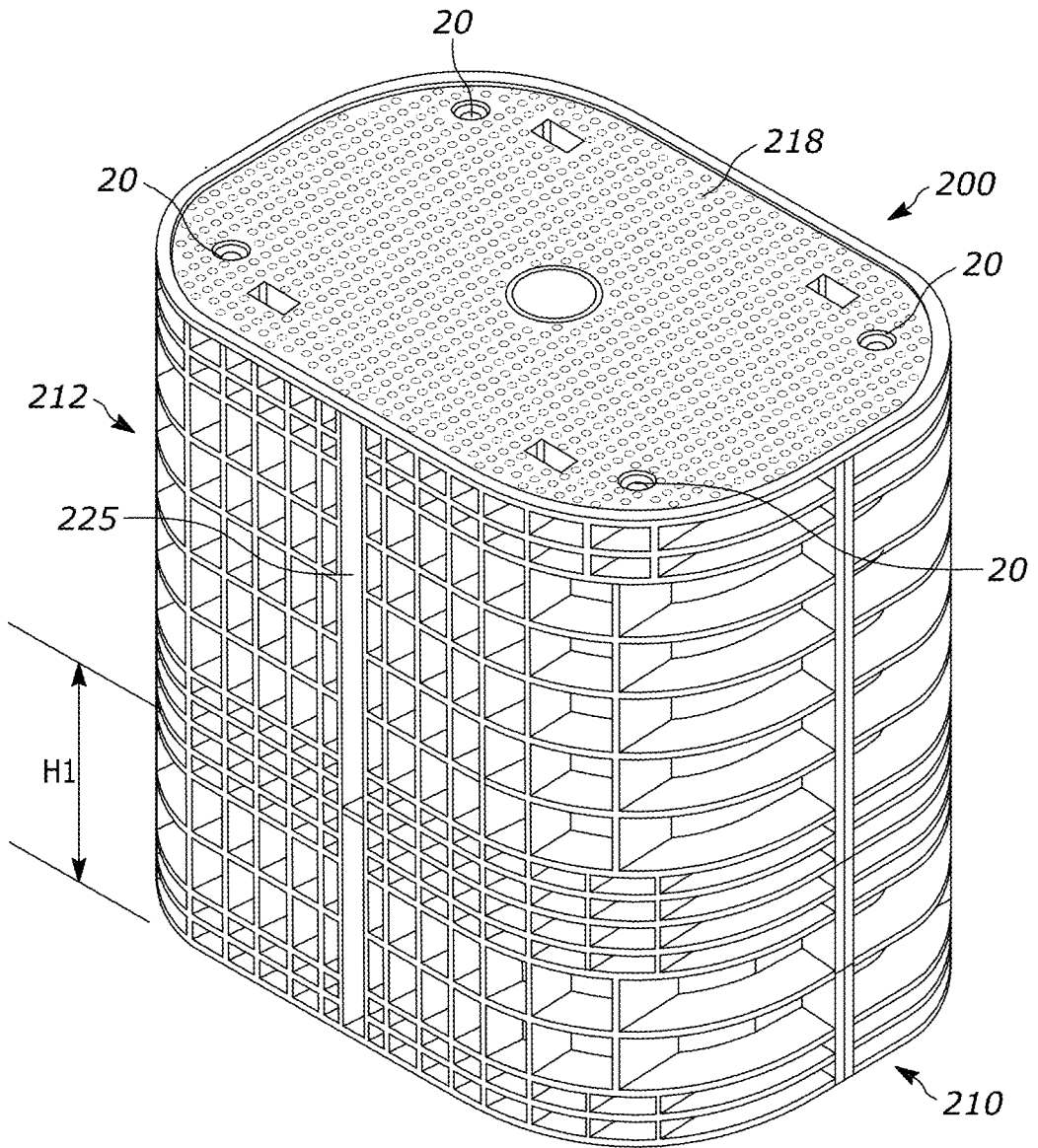
FIG. 39 is a perspective view of an underground enclosure assembly of the present disclosure with a skirt assembly coupled thereto.
Figure 40:
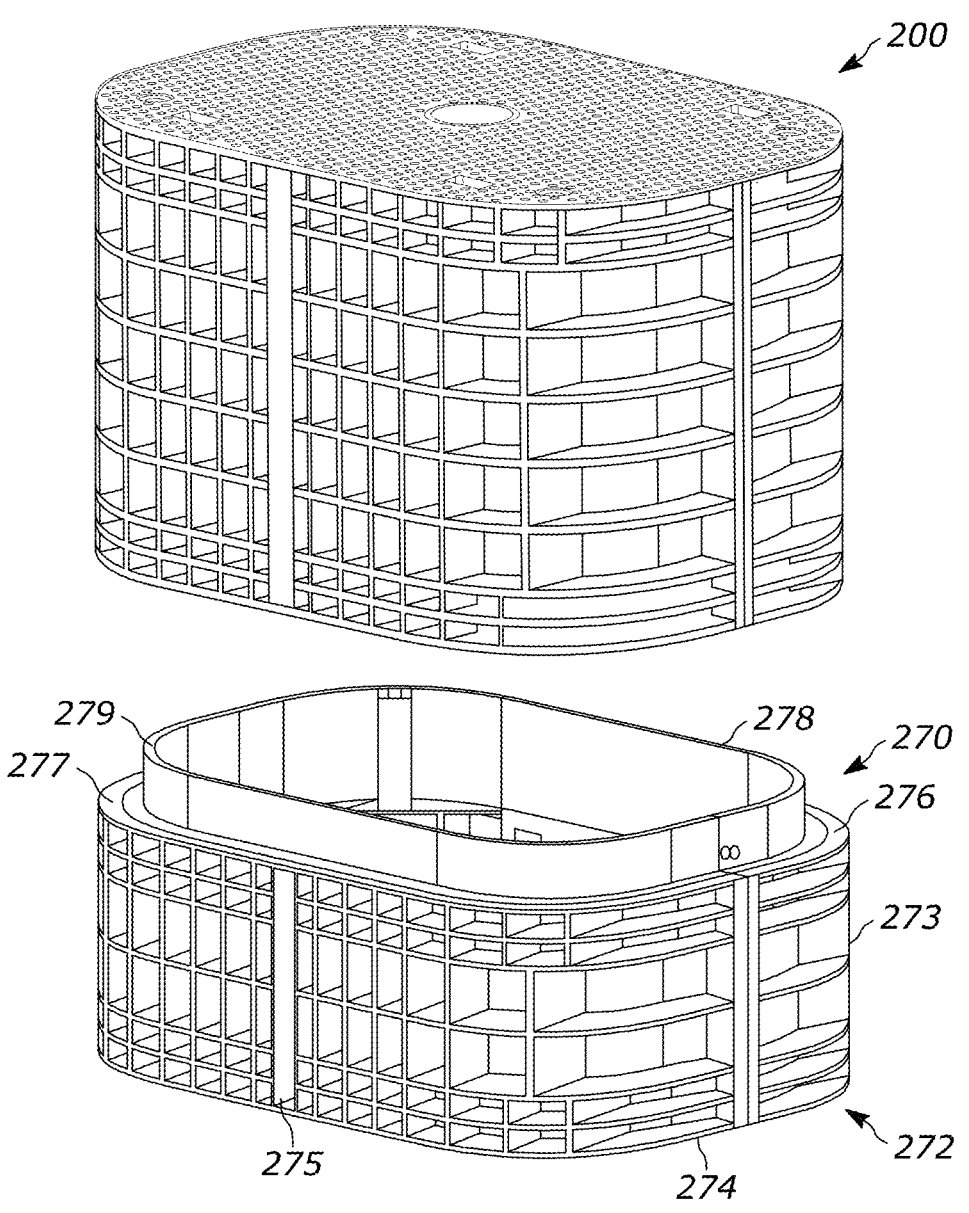
FIG. 40 is another perspective view of the underground enclosure assembly and the skirt assembly of FIG. 39 with the skirt assembly detached from the underground enclosure assembly.
Figure 41:
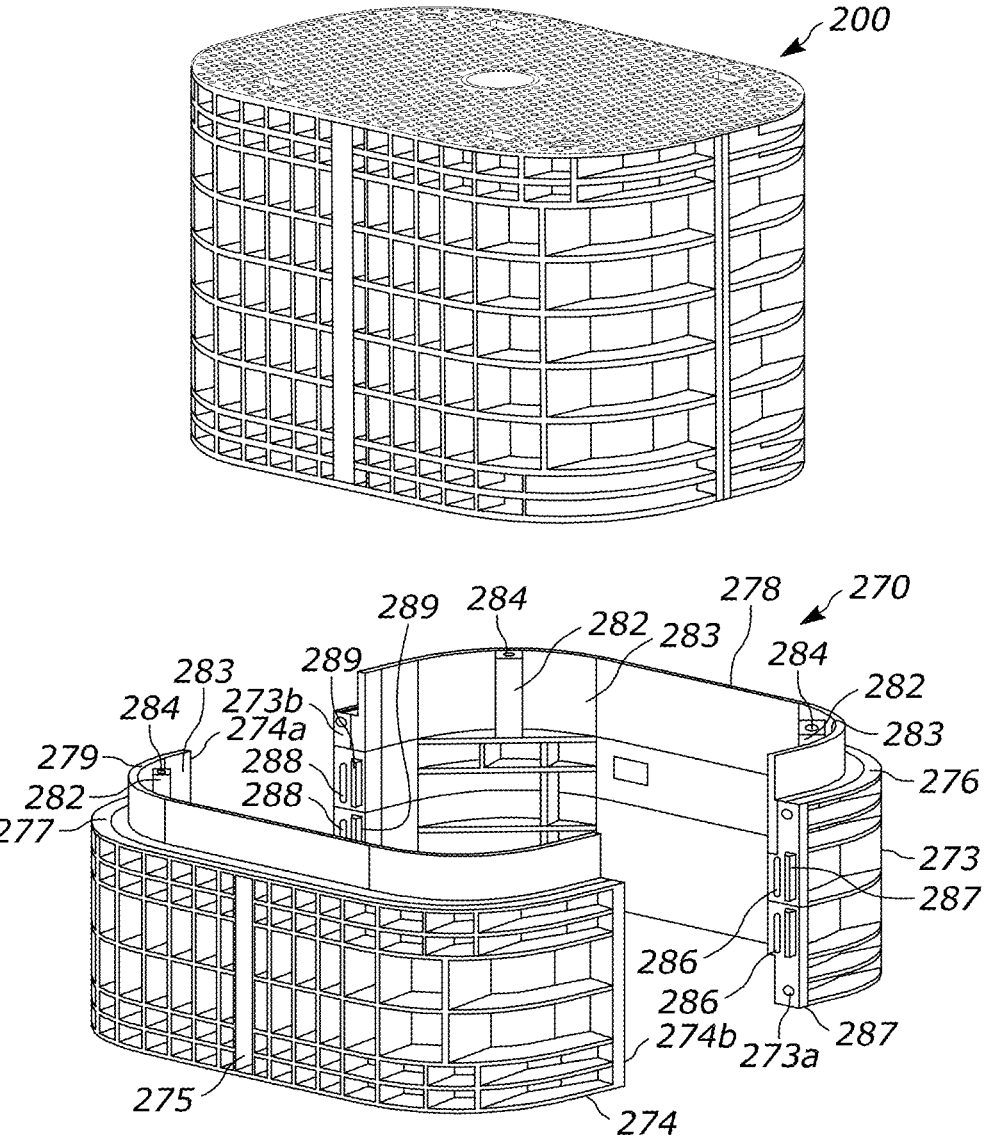
FIG. 41 is another perspective view of the underground enclosure assembly and the skirt assembly of FIG. 39 with the skirt assembly detached from the underground enclosure assembly and a pair of skirt portions of the skirt assembly detached from each other.

Referring now to FIGS. 39-41, the underground enclosure assembly 200 of FIGS. 24 and 25, for example, and described above is depicted with a skirt assembly 270. Portions of the underground enclosure assembly 200 are described in detail above and will not be described again here for the sake of brevity. In this example, an overall height of the underground enclosure assembly 200 may be increased by coupling the underground enclosure assembly 200 to the skirt assembly 270, enabling the underground enclosure assembly 200 to be disposed in deeper pits in the field, for example, yet still readily accessible at ground level. FIGS. 39-41 depict the skirt assembly 270 having an exemplary height H1 of about half the height of the underground enclosure assembly 200. However, it will be appreciated that the skirt assembly 270 may alternatively include various other heights, such as H2, H3, H4, and H5, that are greater than and/or less than the exemplary height H1 to accommodate various sized pits and still fall within the scope of the present disclosure. In one example, a height of the underground enclosure assembly 200 is 24 inches, and the height H1 of the skirt assembly 270 is 12 inches and/or half the height of the underground enclosure assembly 200. More specifically, in one example the underground enclosure assembly 200 includes the following dimensions 24"×36"× 24" and may be attached to the bottom of the skirt assembly 270 including the following dimensions 24"×36"×12. So configured, the total height of the underground enclosure assembly 200 and the skirt assembly 270 is 36 inches in this example.

Referring now to FIG. 40, the skirt assembly 270 is depicted detached from the underground enclosure assembly 200, but still in an assembled position. The skirt assembly 270 includes a pair of skirt portions 272 including a first skirt portion 273 and a second skirt portion 274 coupled to each other via at least one snap projection (not shown), such as the at least one snap projection described above. In this example, each of the first skirt portion 273 and the second skirt portion 274 are the same portions and include a brace assembly 275 (depicted relative to the second skirt member 274 in FIG. 40), which functions in a manner similar to the brace assembly 225 of the underground enclosure assembly 200 described above. Further, each of the first and second skirt portions 273, 274 includes a shoulder 276, 277, respectively, such as disposed on a top portion of each of the first and second skirt portions 273, 274. In addition, the first skirt portion 273 also includes a neck portion 278, and the second skirt portion 274 likewise includes a neck portion 279. Each of the neck portions 278, 279 are semi-oval in shape, such that when the first and second skirt portions 273, 274 are coupled together to form the skirt assembly 270, the first and second neck portions 278, 279 form an oval shape that receives a portion of the body of the underground enclosure assembly 200 when coupled to the skirt assembly 270.

Referring now to FIG. 41, the skirt assembly 270 is again depicted detached from the underground enclosure assembly 200, but now in a position in which the first and second skirt portions 273, 274 are not in the assembled position. Each of the first and second skirt portions 273, 274 further includes a brace 282 disposed in a corner area 283 of each of the first and second skirt portions 273, 274. Each brace 282 includes an aperture 284 for receiving a bolt, such as the bolt assembly 20 described above, to secure the skirt assembly 270 to the underground enclosure assembly 200. It will be appreciated that various other securing mechanisms aside from the brace 282 and bolt combination may additionally and/or alternatively be used and still fall within the scope of the present disclosure.

As further depicted in FIG. 41, the first and second skirt portions 273, 274 are coupled to each other in this example via at least one snap projection. More specifically, each of the first and second skirt portions 273, 274 includes at least one slot 286, 287 disposed on a first end 273a, 274a (not shown). In this example, the first end 273a of the first skirt portion 273 includes four slots: two slots 286 disposed adjacent to an internal area of the skirt assembly 270 and another two other slots 287 disposed adjacent to the first two slots 286. In addition, the second ends 273b, 274b of the first and second skirt portions 273, 274 each include two snap projections 289 disposed adjacent to an internal area of the skirt assembly 270 and another two snap projections 288 disposed adjacent to the first snap projections 289. While the snap projections 288, 289 are depicted on the second end 273b of the first skirt portion 273 of FIG. 41, the same snap projections 288, 289 are also depicted on the second end 274b of the second skirt portion 274 even though not shown in FIG. 41. The snap projections 288, 289 of the second ends 273b, 274b are snapped into the slots 286, 287 of the first ends 273a, 274a to couple the first and second skirt portions 273, 274 together, forming the skirt assembly 270 depicted in FIG. 40, for example.

At least in view of the foregoing, it will be appreciated that the assembly and methods of the present disclosure include several advantages. For example, the unique snap together design of the underground enclosure assembly 10, 100, 200 and method reduces the total number of fasteners required to assemble the underground enclosure assembly 10, 100, 200. In addition, the underground enclosure assembly 10 is easier to install in the field without harmful dust when cutting is required. Further, because the first shell member 14, 114, 214 is identical to the second shell member 16, 116, 216 of the shell assembly 12, 112, 212, the first and second shell members 14, 114, 214, 16, 116, 216 are reversible and interchangeable, again allowing for faster manufacturing and installation. Further, the lid 18, 118, 218 does not require any tool to lift the lid 18, 118, 218 from the shell members 14, 114, 214, 16, 116, 216 when it is desired to remove the lid 18, 118, 218 from the shell assembly 12, 112, 212.

Further, the HDPE components and aluminum materials of the enclosure assembly 10, 100, 200, such as the shell assembly and lid as described above, allow the fully assembled underground enclosure assembly 10, 100, 200 to be lightweight design, such as about 100-120 pounds in a 24"×36"×24" enclosure when fully assembled. It will be appreciated that for different sized enclosures, e.g., 17"× 30"×24" the weight will change approximately due to a change in plastic used and less structural component sizes. In addition, the reversible features of the shell assembly prevents errors when setting and assembling the underground enclosure assembly 10, 100, 200.

Still further, the underground enclosure assembly 10, 100, 200 are lightweight yet durable options for telecommunications infrastructure projects. The lid 18, 118, 218 fits and fastens the same on either end of the shell assembly 12, 112, 212. This versatile design is installer friendly, making it safe and faster to set larger underground enclosure assemblies. The HDPE-based underground enclosure assembly 10, 100, 200 makes it easier and safer for installers to add custom ports for cable ingress/egress in the field, without the dust and tool wear that results from working with precast and concrete products. In addition, the HDPE lid 18, 118, 218 is generally 45% lighter than other conventional lids, while still meeting the load strength requirements.

The figures and description provided herein depict and describe preferred embodiments of the underground enclosure assembly and method of the present disclosure for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. An underground enclosure assembly configured for use with one or more of communications, power and/or irrigation system equipment, the underground enclosure assembly comprising:

a shell assembly with at least two shell members coupled to each other via at least one snap projection, at least one shell member having an outside surface and a brace assembly, the brace assembly including a support channel disposed on the outside surface; and a lid removably coupled to the shell assembly via at least two bolt assemblies, the lid including a flange extending downwardly from a rim portion of the lid and an underside with a plurality of ribs and a lid support, the lid support including a frame having a pair of side bars, a pair of end bars, and an internal bar disposed between the pair of side bars.

2. The underground enclosure assembly of claim 1, the brace assembly further including a support bar disposed on an inside surface of at least one shell member of the shell assembly, the support bar aligned with the support channel disposed on the outside surface of the at least one shell member of the shell assembly.

3. The underground enclosure assembly of claim 2, wherein the support channel includes a C-shape and at least one aperture for receiving a fastener configured to couple the support channel to the outside surface of the shell member, and the support bar includes at least one aperture for receiving a fastener configured to couple the support bar to the inside surface of the shell member.

4. The underground enclosure assembly of claim 2, wherein one of: (1) the support channel and the support bar comprise one or more of aluminum, basalt, fiberglass, high density polyethylene (HDPE), or other plastic material at least in part or in full; or (2) the entire underground enclosure assembly comprises one or more of aluminum, basalt, fiberglass, high density polyethylene (HDPE), or other plastic material.

5. The underground enclosure assembly of claim 1, wherein the internal bar is coupled to each end of the pair of ends, and each side bar of the pair of side bars includes an aperture for receiving a fastening member to couple the side bar to the lid.

6. The underground enclosure assembly of claim 1, wherein one of: (1) the pair of side bars, the pair of end bars, and the internal bar disposed between the pair of side bars each comprises one or more of aluminum, basalt, fiberglass, high density polyethylene (HDPE), or other plastic material at least in part or in full; or (2) the entire underground assembly comprises one or more of aluminum, basalt, fiberglass, high density polyethylene (HDPE), or other plastic material.

7. The underground enclosure assembly of claim 1, further comprising a skirt assembly removably coupled to a bottom portion of the underground enclosure assembly, the skirt assembly including a first skirt portion and a second skirt portion removably coupled to the first skirt portion, each of the first and second skirt portions including at least one brace disposed in a corner area of the first and second skirt portions, the at least one brace configured to couple the skirt assembly to the bottom portion of the underground assembly.

8. An underground enclosure assembly configured for use with one or more of communications, power and/or irrigation system equipment, the underground enclosure assembly comprising:

a clamshell assembly having a first clamshell member and a second clamshell member coupled to the first clamshell member, each of the first and second clamshell members having at least one side edge with a plurality of snap projections and a plurality of apertures, the plurality of snap projections of the first clamshell member snaps into the plurality of apertures of the second clamshell member to couple the first and second shell members to each other; and a lid removably coupled to the clamshell assembly via at least two bolt assemblies, the lid including an underside with a plurality of ribs and a lid support including a frame having a pair of side bars, a pair of end bars coupled to the pair of side bars, and an internal bar disposed between the pair of side bars and coupled to the pair of end bars, a flange extending downwardly from a rim portion of the lid and a groove configured to receive a mating lip of the first clamshell member and the second clamshell member.

9. The enclosure assembly of claim 8, wherein each of the first and second clamshell members includes an outside surface having a grid pattern with a plurality of ribs and a brace assembly, the brace assembly including a channel support disposed on the outside surface and a support bar disposed on an inside surface of the clamshell member and aligned with the channel support, and the first clamshell member is identical to the second clamshell member.

10. The enclosure assembly of claim 8, wherein the lid includes one of two apertures or four apertures disposed along a circumference of the lid at a distance equidistant from each other, each aperture adapted to receive a bolt of one of the at least two bolt assemblies to couple the lid to the shell assembly, wherein the at least two bolt assemblies include one of two bolt assemblies or four bolt assemblies.

11. An underground enclosure assembly configured for use with one or more of communications, power and/or irrigation system equipment, the underground enclosure assembly comprising:

a shell assembly with at least two shell members coupled to each other via at least one snap projection; and a lid removably coupled to the shell assembly via at least two bolt assemblies, the lid including an underside with a plurality of ribs and a flange extending downwardly from a rim portion of the lid, wherein the lid includes one or more of: (1) at least two apertures disposed along a circumference of the lid at a distance equidistant from each other, each aperture adapted to receive a bolt of one of the at least two bolt assemblies to couple the lid to the shell assembly, the lid further including a groove disposed on the underside of the lid, the groove configured to receive a mating lip of the two shell members: (2) an insert removably disposed on a top surface of the lid, the insert interchangeable to include various designs of inserts; and (3) a lid support disposed on the underside of the lid, the lid support including a frame having a pair of side bars, a pair of end bars coupled to the pair of side bars, and an internal support bar disposed between the pair of side bars and coupled to each end of the pair of end bars, and wherein the at least two bolt assemblies includes one of:
(1) two bolt assemblies; or
(2) four bolt assemblies, and wherein each of the at least two shell members of the shell assembly includes a retainer nut, each of which is configured to receive a bolt of one of the at least two bolt assemblies to secure the lid to the shell assembly and optionally at least one bolt assembly of the at least two bolt assemblies further includes a clip configured to be coupled to the retainer nut, the clip including an aperture and a gap, the aperture is configured to receive a portion of a base of the retainer nut when the at least one bolt assembly is in an assembled configuration, and the gap is configured to receive the cylindrical portion of the retainer nut in the assembled configuration.

12. The enclosure assembly of claim 11, wherein one or more of: (1) each shell member includes an inside wall having a top portion, a bottom portion, an upper shelf disposed near a top portion of the inside wall, and a lower shelf disposed near a bottom portion of the inside wall, each of the upper shelf and the lower shelf including an aperture;
(2) the at least two shell members includes four shell members, each shell member coupled to another shell member via at least one snap projection; and (3) each shell member includes an outside wall and an inside wall, and at least one shell member includes a brace assembly, the brace assembly including a support channel disposed on the outside wall of the shell member and support bar disposed on the inside wall and aligned with a position of the brace disposed on the outside wall.

13. The enclosure assembly of claim 11, wherein one or more of: (1) the shell assembly is a clamshell assembly; (2) each shell member is a clamshell member having a C-shape; and (2) the at least two shell members including four shell members, the four shell members including a first shell member, a second shell member, a third shell member, and a fourth shell member, each of the first, second, third, and fourth shell members having a first side edge and a second side edge and coupled to each other, forming the shell assembly.

14. The enclosure assembly of claim 11, the at least two shell members include a first shell member and a second shell member, each of the first and second shell members having a first side edge and a second side edge, and the first side edge of the first shell member is coupled to the second side edge of the second shell member, and the first side end of the second shell member is coupled to the second side end of the first shell member, forming the shell assembly.

15. The enclosure assembly of claim 14, wherein each of the first and second side edges of each of the first and second shell members includes at least one snap projection, the at least one snap projection comprising a plurality of snap projections, and at least one aperture, the at least one aperture comprising a plurality of apertures, and the plurality of snap projections of each side edge snaps into the plurality of apertures of the other side edge to couple the first and second shell members to each other.

16. The enclosure assembly of claim 11, wherein the at least two shell members include a first shell member and a second shell member, and each shell member includes an outside surface having a grid pattern with a plurality of ribs.

17. The enclosure assembly of claim 16, wherein the plurality of ribs includes a plurality of vertical ribs and a plurality of horizontal ribs, at least one rib of the plurality of vertical ribs intersecting with at least one rib of the plurality of horizontal ribs.

18. The enclosure assembly of claim 11, wherein the at least two shell members include a first shell member and a second shell member, the first shell member is identical to the second shell member.

19. The enclosure assembly of claim 11, wherein each shell member of the at least two shell members includes a top surface on which the rim portion of the lid is disposed, each top surface including a mating lip configured to receive a groove of the lid, and a bottom surface, each bottom surface including a mating lip configured to receive the groove of the lid when the two shell members are reversed and the bottom surface receives the lid.

20. The enclosure assembly of claim 11, wherein each shell member of the shell assembly and the lid comprises high-density polyethylene (HDPE).

* * * * *